US012532993B2

(12) United States Patent
Brown et al.

(10) Patent No.: US 12,532,993 B2
(45) Date of Patent: Jan. 27, 2026

(54) HANDLE AND FITMENT ASSEMBLY

(71) Applicant: THE CLOROX COMPANY, Oakland, CA (US)

(72) Inventors: Stefan Brown, Pleasanton, CA (US); Benjamin Ma, Pleasanton, CA (US); Russell E. Bell, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 213 days.

(21) Appl. No.: 17/157,181

(22) Filed: Jan. 25, 2021

(65) Prior Publication Data

US 2022/0233035 A1 Jul. 28, 2022

(51) Int. Cl.

| | |
|---|---|
| ***A47K 17/00*** | (2006.01) |
| ***A46B 5/00*** | (2006.01) |
| ***A46B 9/00*** | (2006.01) |
| ***B08B 9/087*** | (2006.01) |

(52) U.S. Cl.

CPC ............ *A47K 17/00* (2013.01); *A46B 5/0095* (2013.01); *A46B 9/005* (2013.01); *B08B 9/087* (2013.01)

(58) Field of Classification Search

CPC ........ A47K 17/00; A47K 11/00; A47K 11/10; A46B 5/0095; A46B 9/005; A46B 2200/304; B08B 9/087

See application file for complete search history.

(56) References Cited

U.S. PATENT DOCUMENTS

| | | | |
|---|---|---|---|
| 1,124,073 | A | 1/1915 | Sullivan |
| 1,779,057 | A | 10/1930 | Tolmach |
| 2,428,306 | A | 9/1947 | Beagle |
| 2,752,625 | A | 7/1956 | Ponsell |
| 2,764,774 | A | 10/1956 | Belsky et al. |
| 3,214,779 | A | 11/1965 | Wheeler |
| 3,256,075 | A | 6/1966 | Robert et al. |
| 4,457,038 | A | 7/1984 | Hammond |
| 4,466,152 | A | 8/1984 | Moss et al. |
| 4,493,124 | A | 1/1985 | Agapiou |
| 4,642,836 | A | 2/1987 | Bokmiller |
| 4,663,796 | A | 5/1987 | Helling et al. |
| 4,796,325 | A | 1/1989 | Bortman |
| 4,852,201 | A | 8/1989 | Wundrock et al. |
| 4,987,634 | A | 1/1991 | Weihrauch |

(Continued)

FOREIGN PATENT DOCUMENTS

| | | | |
|---|---|---|---|
| EP | 0313495 | A1 | 4/1989 |
| EP | 1254950 | A2 | 11/2002 |

(Continued)

OTHER PUBLICATIONS

International Search Report and Written Opinion regarding International Patent Application No. PCT/US2023/011939, dated Apr. 12, 2023.

(Continued)

*Primary Examiner* — Alexander Markoff

(74) *Attorney, Agent, or Firm* — Harness, Dickey & Pierce, P.L.C.

(57) ABSTRACT

Discloses is an assembly for providing a cleaning assembly. The cleaning assembly may include multiple portions, such as a handle portion and a cleaning portion. The cleaning assembly may further include a disposable head portion that may be engaged and disengaged from the handle assembly.

16 Claims, 18 Drawing Sheets

(56) References Cited

U.S. PATENT DOCUMENTS

| | | | | |
|---|---|---|---|---|
| 5,381,809 | A | 1/1995 | Parker, Jr. | |
| 5,407,594 | A | 4/1995 | Fry et al. | |
| 5,410,771 | A | 5/1995 | Bereza | |
| 5,471,697 | A | 12/1995 | Daconta | |
| 5,551,115 | A | 9/1996 | Newville | |
| 5,630,243 | A | 5/1997 | Federico et al. | |
| 5,642,913 | A | 7/1997 | Brown | |
| 5,658,874 | A | 8/1997 | Davies et al. | |
| 5,842,810 | A | 12/1998 | Morad | |
| 5,862,565 | A | 1/1999 | Lundstedt | |
| 5,888,002 | A | 3/1999 | Fenstersheib | |
| 5,941,379 | A | 8/1999 | Barardo | |
| 5,945,076 | A | 8/1999 | Leonard et al. | |
| D413,470 | S | 9/1999 | Burton | |
| 6,094,771 | A | 8/2000 | Egolf et al. | |
| 6,154,913 | A | 12/2000 | Burton | |
| 6,191,100 | B1 | 2/2001 | Askew et al. | |
| RE37,190 | E | 5/2001 | Stowell et al. | |
| 6,295,688 | B1 | 10/2001 | Sayles et al. | |
| 6,313,086 | B1 | 11/2001 | Askew et al. | |
| 6,355,607 | B1 | 3/2002 | Rahman et al. | |
| 6,405,403 | B1 | 6/2002 | McKay | |
| 6,413,928 | B1 | 7/2002 | Painter et al. | |
| 6,426,111 | B1 | 7/2002 | Hirsch | |
| 6,523,213 | B1 | 2/2003 | Post | |
| 6,611,986 | B1 | 9/2003 | Seals | |
| D496,586 | S | 9/2004 | Belser et al. | |
| D501,728 | S | 2/2005 | Conway et al. | |
| D502,002 | S | 2/2005 | Conway et al. | |
| D502,324 | S | 3/2005 | Conway et al. | |
| D504,065 | S | 4/2005 | Belser et al. | |
| 6,978,508 | B2 | 12/2005 | Young | |
| D520,852 | S | 5/2006 | Minkler et al. | |
| 7,059,008 | B2 | 6/2006 | Morgan et al. | |
| 7,065,825 | B2 | 6/2006 | Minkler et al. | |
| 7,127,768 | B2 * | 10/2006 | Blum | A47K 11/10<br>15/210.1 |
| D532,564 | S | 11/2006 | Neumann et al. | |
| 7,146,676 | B2 | 12/2006 | Kubes et al. | |
| 7,159,265 | B2 | 1/2007 | Soller et al. | |
| 7,213,706 | B2 | 5/2007 | Belser et al. | |
| 7,275,276 | B2 | 10/2007 | Jaszenovics et al. | |
| 7,316,046 | B2 | 1/2008 | Michaels et al. | |
| 7,344,553 | B2 | 3/2008 | Opolski et al. | |
| 7,386,910 | B2 * | 6/2008 | Minkler | A47L 13/16<br>15/210.1 |
| 7,446,082 | B2 | 11/2008 | Kilkenny et al. | |
| 7,470,652 | B2 | 12/2008 | Kilkenny et al. | |
| 7,530,138 | B1 * | 5/2009 | Platt | A46B 9/005<br>15/210.1 |
| 7,533,437 | B1 | 5/2009 | Gartner | |
| 7,603,739 | B2 | 10/2009 | Minkler et al. | |
| 8,015,653 | B2 | 9/2011 | Bargiel et al. | |
| 8,286,295 | B2 | 10/2012 | Minkler et al. | |
| 8,888,395 | B1 | 11/2014 | Hinnant | |
| 9,021,649 | B2 | 5/2015 | Minkler et al. | |
| 9,237,939 | B2 | 1/2016 | Maurer et al. | |
| 9,655,482 | B2 | 5/2017 | Michelson et al. | |
| 10,264,941 | B2 | 4/2019 | Koval et al. | |
| 10,932,646 | B2 | 3/2021 | Weaver et al. | |
| 11,253,127 | B2 | 2/2022 | Yan | |
| 2002/0007527 | A1 | 1/2002 | Hart | |
| 2002/0032137 | A1 | 3/2002 | DeSenna et al. | |
| 2002/0061831 | A1 | 5/2002 | Kaziska et al. | |
| 2002/0083542 | A1 | 7/2002 | Hart | |
| 2002/0173442 | A1 | 11/2002 | Smith et al. | |
| 2004/0088808 | A1 | 5/2004 | Vitantonio et al. | |
| 2004/0255418 | A1 * | 12/2004 | Minkler | A47K 11/10<br>15/210.1 |
| 2005/0005378 | A1 | 1/2005 | Soller et al. | |
| 2005/0055787 | A1 * | 3/2005 | Blum | A47K 11/10<br>15/210.1 |
| 2005/0066465 | A1 * | 3/2005 | Minkler | A47L 13/16<br>15/210.1 |
| 2005/0246849 | A1 | 11/2005 | Minkler et al. | |
| 2007/0006412 | A1 | 1/2007 | Soller et al. | |
| 2007/0094827 | A1 | 5/2007 | Kilkenny et al. | |
| 2009/0152132 | A1 | 6/2009 | Wang | |
| 2009/0159487 | A1 | 6/2009 | Tacoma | |
| 2012/0216831 | A1 | 8/2012 | Cobabe et al. | |
| 2014/0157535 | A1 * | 6/2014 | Minkler | A47K 11/10<br>15/104.94 |
| 2018/0132678 | A1 * | 5/2018 | Farrow | A47K 11/10 |
| 2020/0163447 | A1 | 5/2020 | Spitaletta | |
| 2021/0052117 | A1 * | 2/2021 | O'Brien | A46B 5/0041 |
| 2021/0137325 | A1 | 5/2021 | Hersey | |
| 2022/0232960 | A1 * | 7/2022 | Brown | B25G 3/12 |
| 2022/0233035 | A1 | 7/2022 | Brown et al. | |

FOREIGN PATENT DOCUMENTS

| | | | | |
|---|---|---|---|---|
| EP | 1254950 | A3 | 5/2003 | |
| JP | 09135728 | A | 5/1997 | |
| JP | H09135728 | A | 5/1997 | |
| JP | 10295610 | A2 | 11/1998 | |
| WO | WO8700411 | A1 | 1/1987 | |
| WO | 0034422 | A2 | 6/2000 | |
| WO | WO0034422 | A3 | 6/2000 | |
| WO | WO0071012 | A1 | 11/2000 | |
| WO | WO0115587 | A1 | 3/2001 | |
| WO | WO0126499 | A1 | 4/2001 | |
| WO | WO0130954 | A1 | 5/2001 | |
| WO | WO0143618 | A1 | 6/2001 | |
| WO | WO0149818 | A1 | 7/2001 | |
| WO | 2005006933 | A2 | 1/2005 | |
| WO | WO2005006933 | A3 | 1/2005 | |
| WO | WO-2020251464 | A1 * | 12/2020 | A46B 3/08 |

OTHER PUBLICATIONS

International Preliminary Report on Patentability regarding International Patent Application No. PCT/US2023/011939, dated Aug. 6, 2024, 10 pages.

Requisition received by the Canadian Intellectual Property Office for Canadian Application No. 3,216,886 dated Feb. 17, 2025, 6 pages.

U.S. Appl. No. 17/156,361, filed Jan. 22, 2021, Stefan Brown.

U.S. Appl. No. 17/590,646, filed Feb. 1, 2022, Keith Alsberg.

Requisition received by the Canadian Intellectual Property Office for Canadian Application No. 3,216,886 dated Aug. 20, 2025, 4 pages.

* cited by examiner

HANDLE AND FITMENT ASSEMBLY

FIELD

The subject disclosure relates to an assembly, in particular to a handle and head assembly having an attachment region between a connector and a fitment and a mechanism for engaging and disengaging the fitment from the connector.

BACKGROUND

This section provides background information related to the present disclosure which is not necessarily prior art.

Various items may generally be selected to be cleaned and/or sanitized after a selected period of time. For example, a toilet bowl may include a receptacle or bowl area that may become soiled after one or more uses. The soiled bowl may be cleaned with a selected device.

Generally, a cleaning device for a soiled bowl of a toilet assembly may include a scrubbing portion and a holding portion. Generally, the scrubbing portion is fixed to the holding portion and must be inserted and removed from the toilet bowl during and after use. Therefore, the scrubbing portion may generally include a portion of the material removed from the bowl that may be cleaned therefrom and/or desired to be cleaned therefrom.

SUMMARY

This section provides a general summary of the disclosure, and is not a comprehensive disclosure of its full scope or all of its features.

Disclosed herein is an assembly that allows for cleaning of various items, such as a toilet bowl. The assembly may include a handle portion and a removable and/or disposable head or scrubbing portion. Generally, the head portion may be releasably attached to the handle.

The handle may include a mechanism to engage or disengage the head portion. The head portion may, therefore, be selectively attached to the handle portion for use. After use, the head portion may be releasably detached from the handle portion. Therefore, the head portion need not be retained for later uses and any soil on the head portion may be disposed of in a permanent and sanitary manner.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
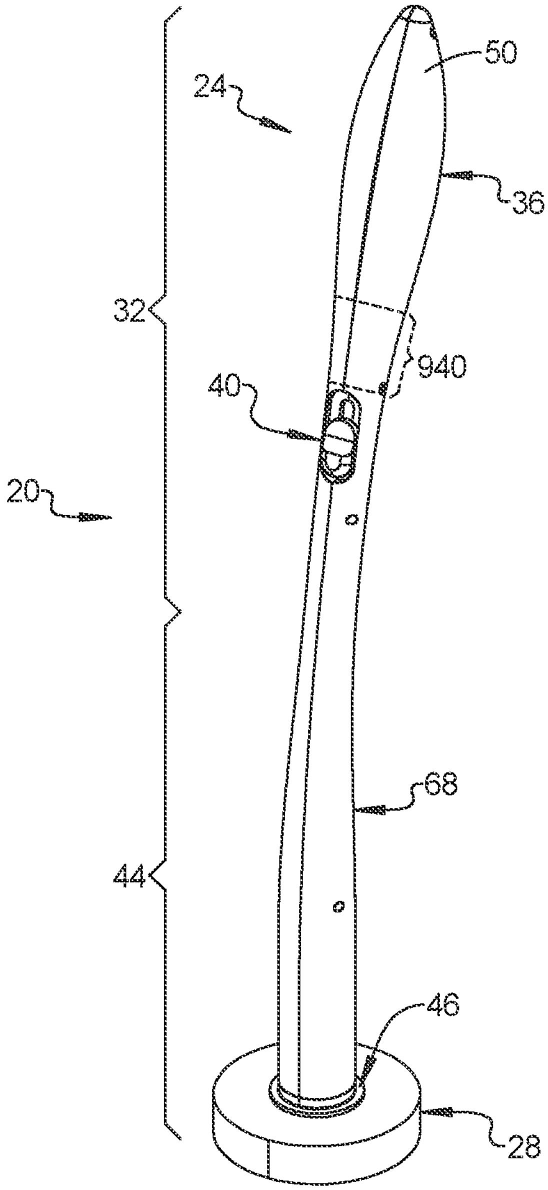
FIG. 1 is a perspective view of a handle and head assembly.
Figure 2:
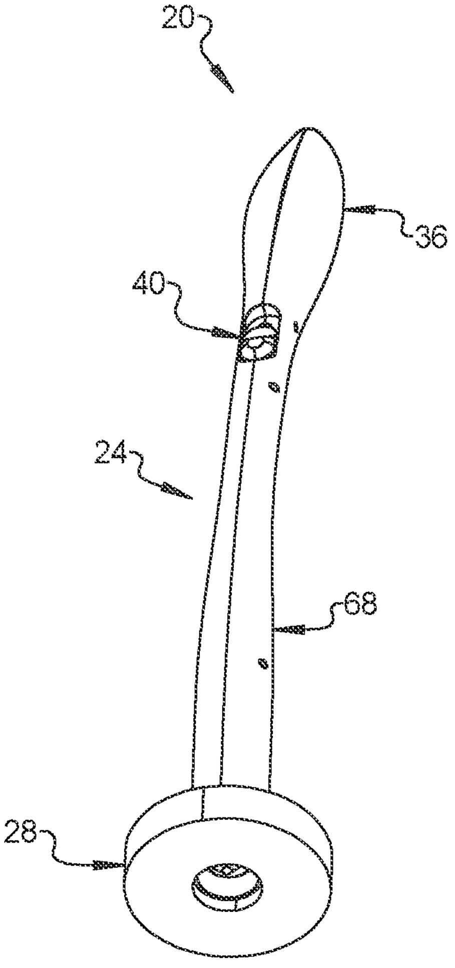
FIG. 2 is a bottom perspective view of the handle and head assembly of FIG. 1.
Figure 3:
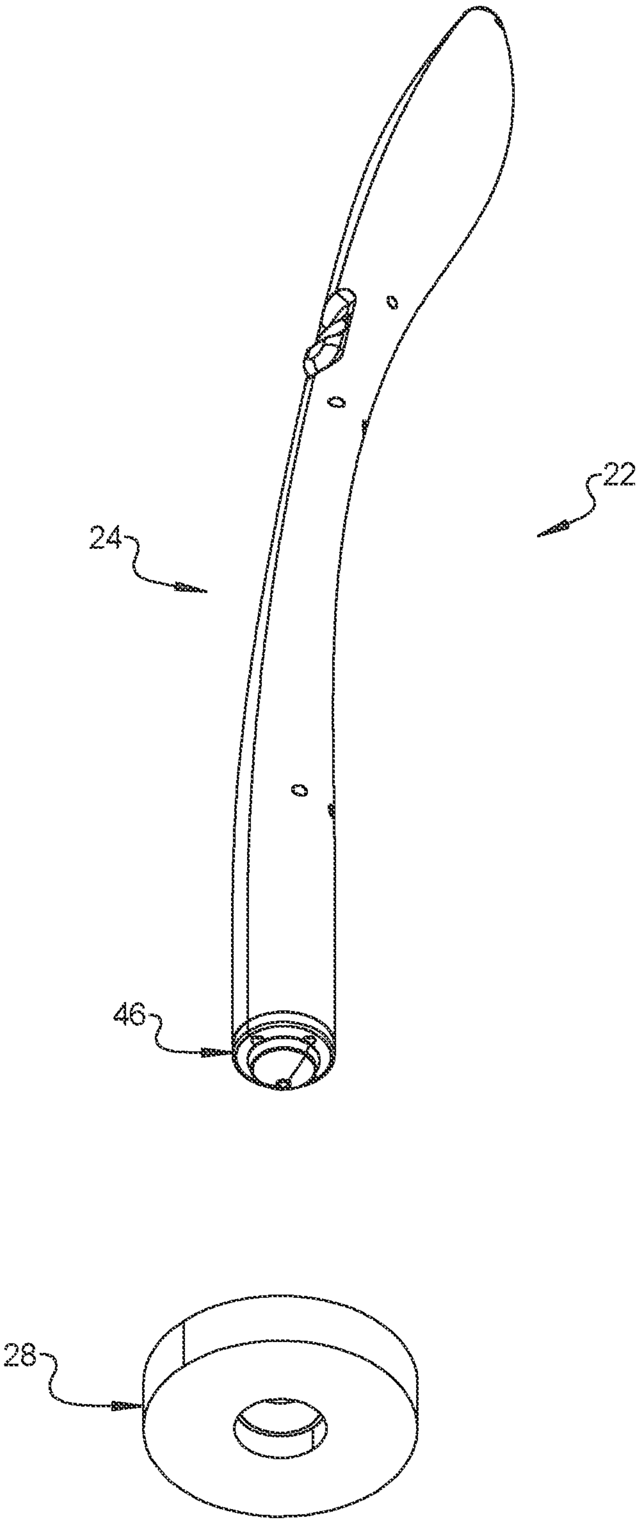
FIG. 3 is a partial exploded view of the handle from the head of the handle and head assembly of FIG. 1.

With initial reference to FIGS. 1, 2, and 3, a cleaning assembly or cleaning tool assembly 20 is illustrated. The cleaning assembly 20 may also be referred to as a toilet cleaning system, a cleansing system, etc. The cleaning assembly 20 may include a handle or wand portion 24 and a head portion 28. The wand portion 24 may be formed as an elongated handle and may include various features or portions, such as a proximal portion or region 32 that may generally include a holding portion 36 that is configured to be grasped or manipulated for use of the cleaning assembly 20. The proximal portion 32 may also include various control mechanisms, such as a control switch or slide 40, as discussed further herein. The handle 24 may further include a distal portion 44 that may include a head engaging or contacting portion or region 46, as discussed further herein.

The handle 24 may generally include a substantially rigid outer or external wall 50. The wall 50 may extend along the proximal region 32 and the distal region 44. In various embodiments, the wall 50 may include one or more members that are assembled together to form the wand or handle 24. In various embodiments, for example, the wall 50 may be formed as two portions that are assembled together, as discussed further herein, in a clamshell manner Nevertheless, the cleaning assembly 20 may include the handle or wand portion 24 that may be selectively engaged to the head or cleaning portion 28, as also discussed further herein.

With continuing reference to FIGS. 1-3, and additional reference to FIGS. 4, 5, 6, 7, 8, and 9, the handle assembly portion 24 is illustrated. In various embodiments, the graspable or grasping portion 36 may include a selected geometry or contour that has a tapered geometry or configuration from a middle region or portion 60 to a distal end 64. Further, the grasping region 36 may taper toward the engaging end 46. The handle 24 may include a narrow waist or central region or portion 68 to which the graspable region 36 tapers. Further, the handle portion 24 may again taper out or expand as it extends toward the distal or terminal end 46.

Figure 4:
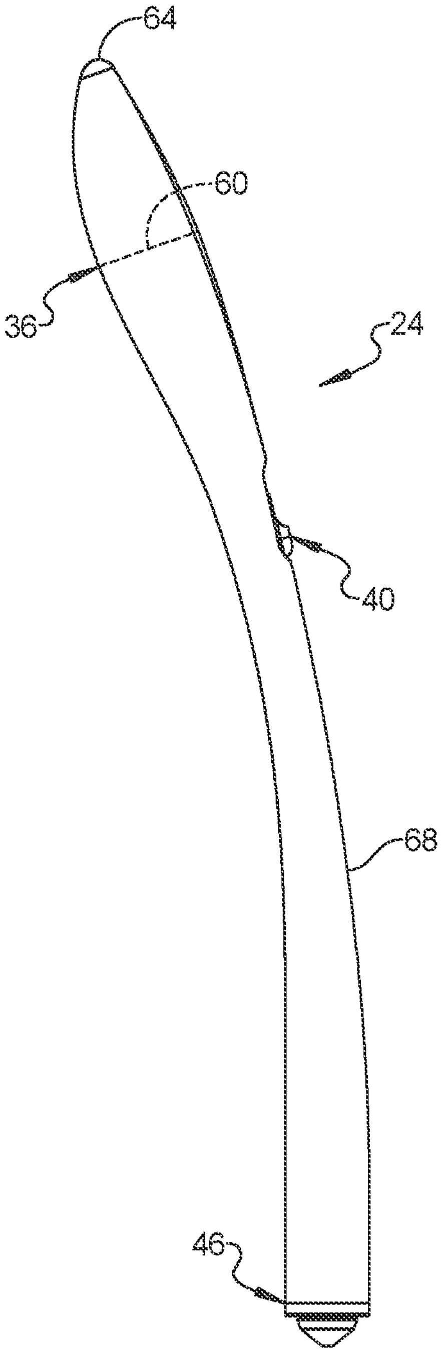
FIG. 4 is a first side elevation view of a handle assembly.
Figure 5:
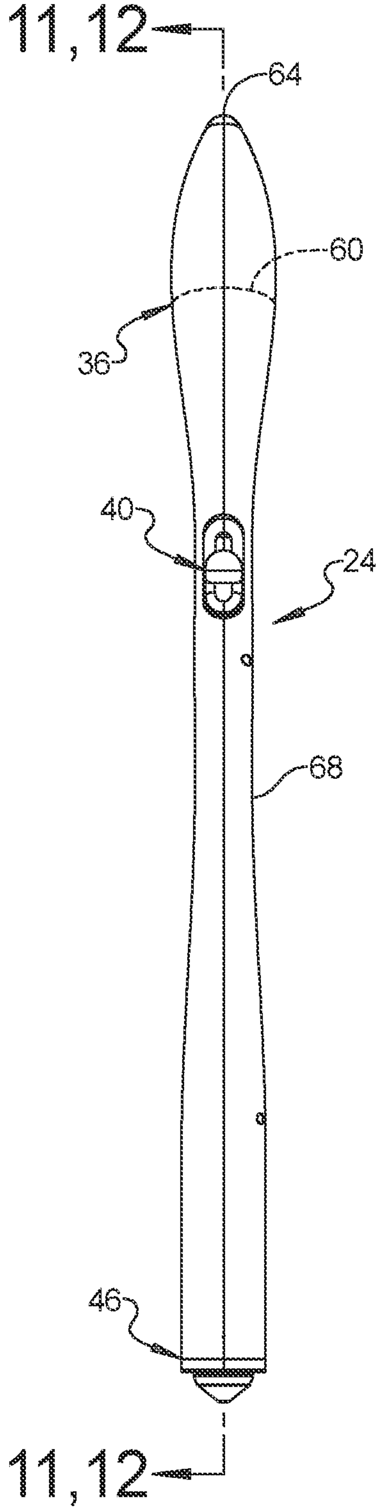
FIG. 5 is a front elevation view of a handle assembly.
Figure 6:
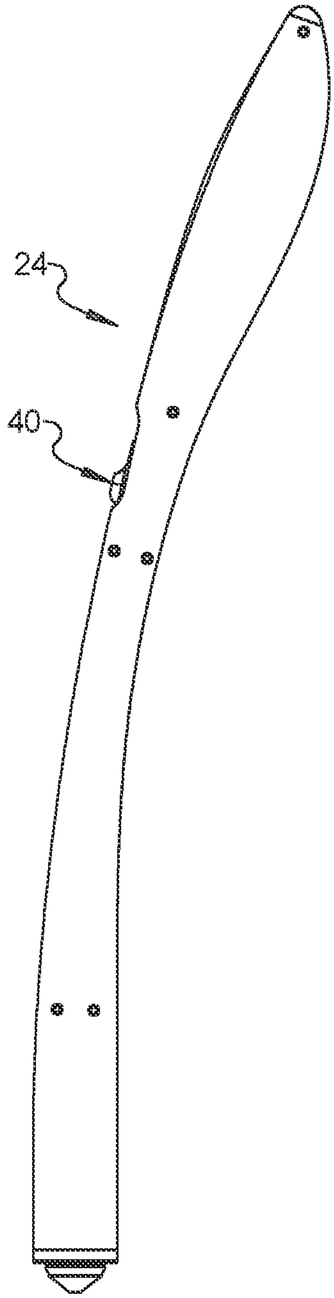
FIG. 6 is a second side elevation view of a handle assembly.
Figure 7:
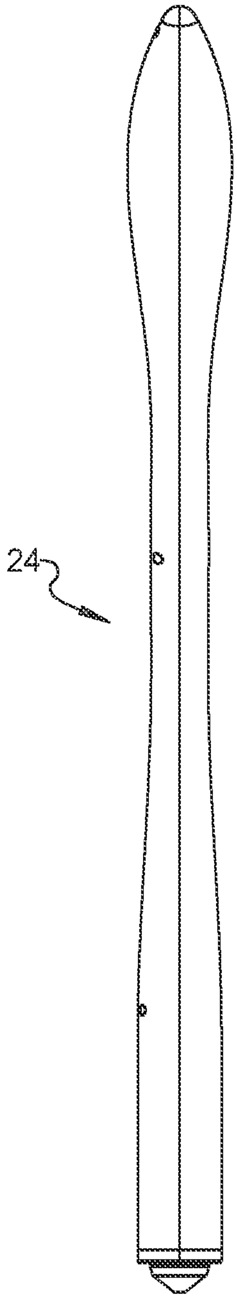
FIG. 7 is a rear elevation view of a handle assembly.
Figure 8:
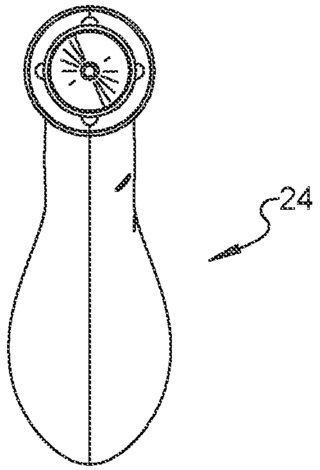
FIG. 8 is a first end view of a handle assembly.
Figure 9:
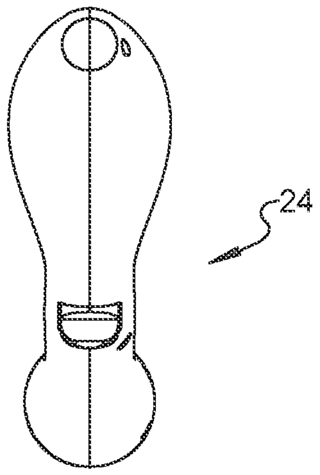
FIG. 9 is a second end view of a handle assembly.

With particular reference to FIG. 5, the handle 24 may also taper in a direction substantially transverse to the direction illustrated in FIG. 4. For example, the grasping region 36 may taper from the central or bulbous region 60 to the distal end 64 and toward the waist 68. Again, the handle 24 may taper from the waist 68 to the end 46. Thus the handle portion or region 24 may include a selected geometry.

Figure 10:
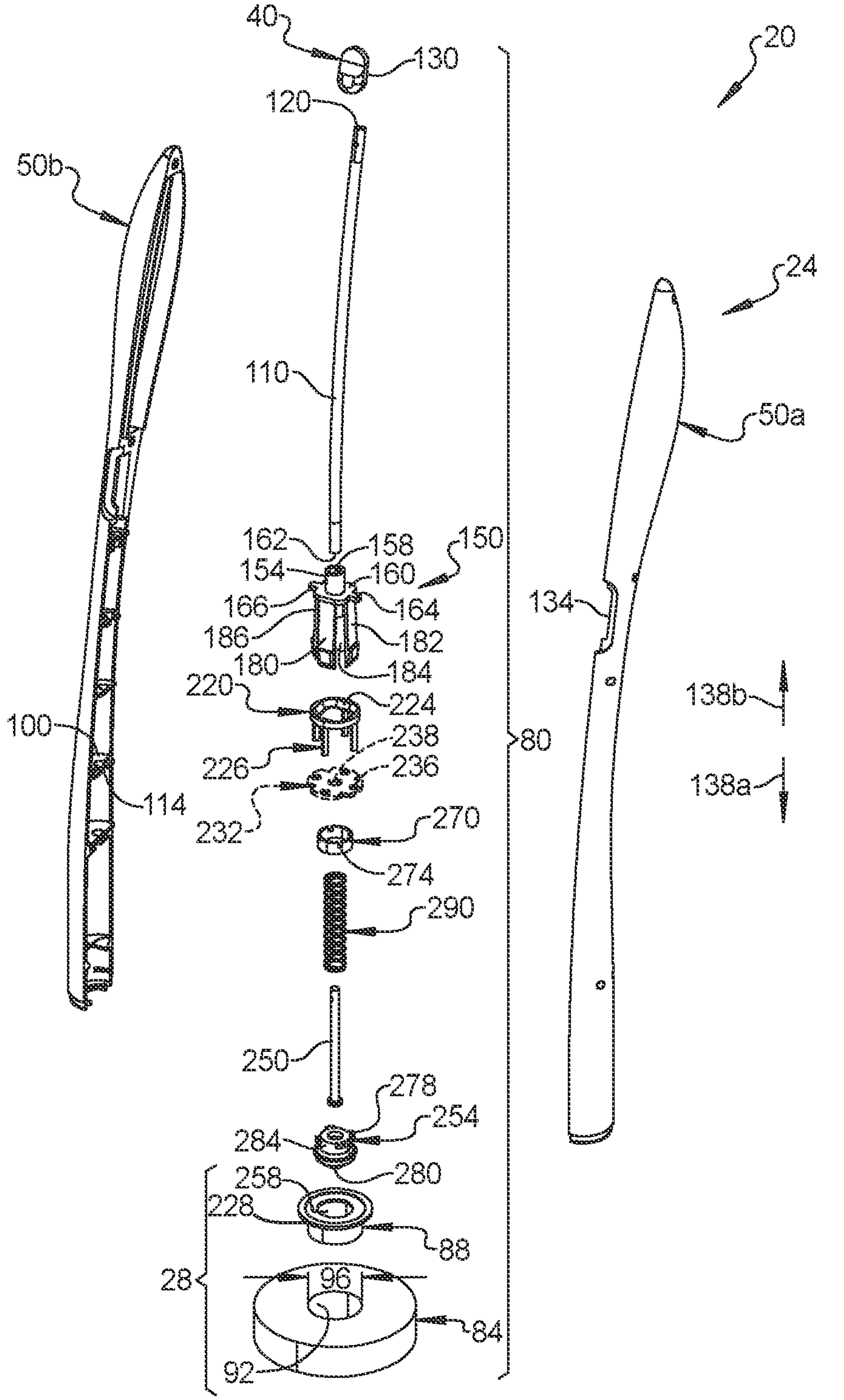
FIG. 10 is an exploded view of the handle and head assembly of FIG. 1.
Figure 11:
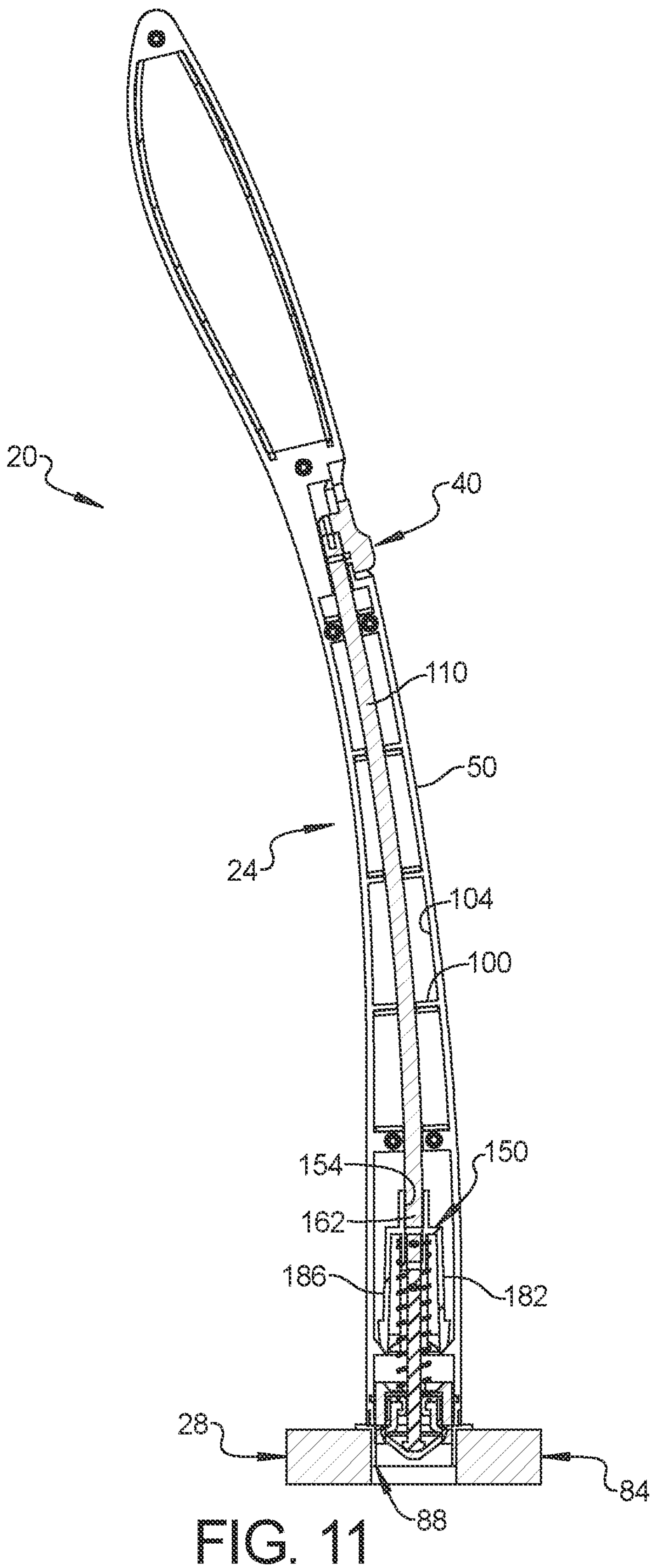
FIG. 11 is a cross-sectional view taken along line 11-11 of FIG. 5.
Figure 12:
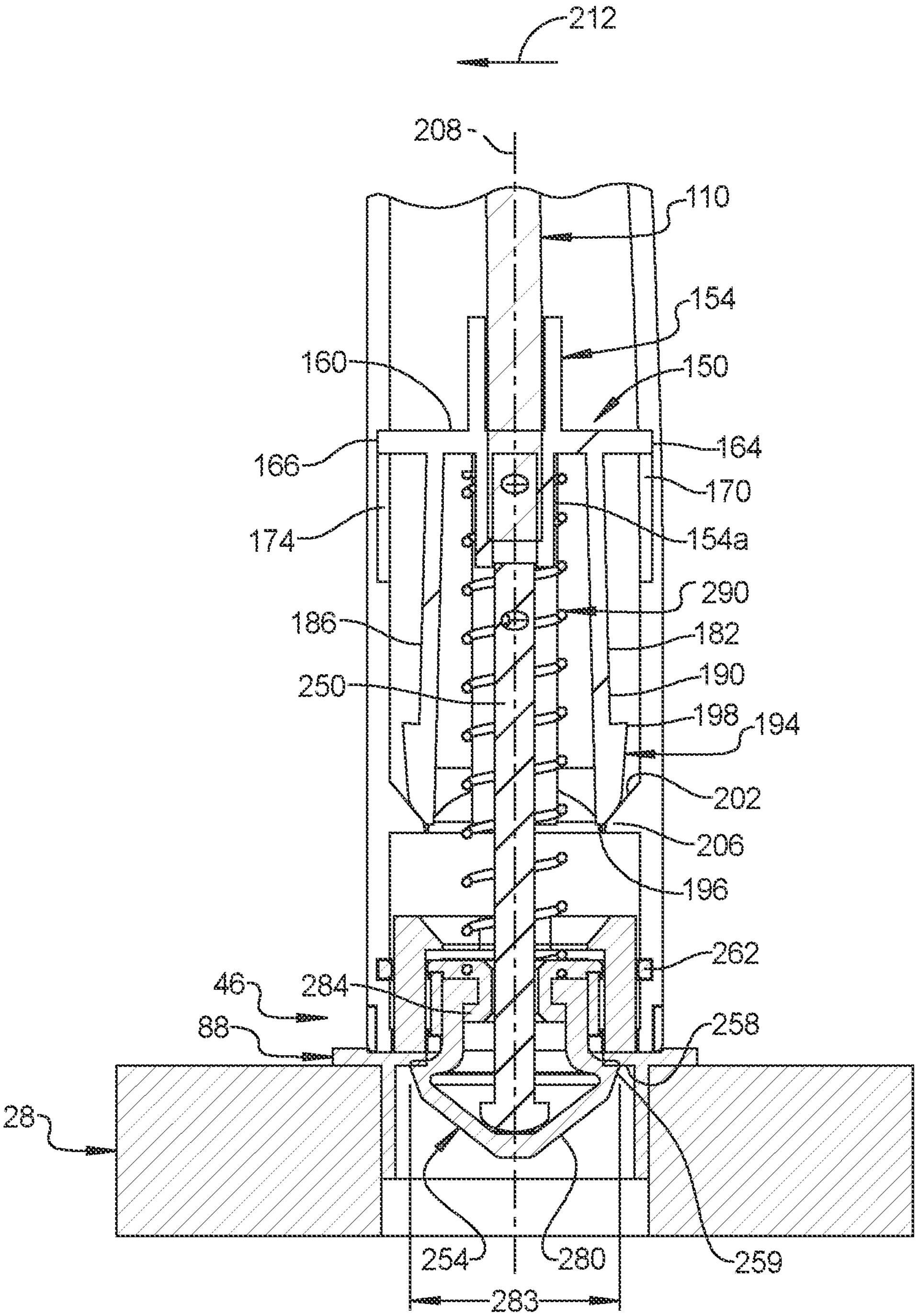
FIG. 12 is a detail cross-sectional view taken along line 12-12 of FIG. 5.

With continuing reference to FIGS. 1-9, and additional reference to FIGS. 10, 11, and 12 the cleaning or working assembly 20 includes various components to assist in operating or moving the cleaning portion or pad 28 with the handle portion or region 24. As discussed above, a control or operation button 40 may be used to move selected portions of an actuation mechanism 80 to engage and disengage the cleaning portion or head 28. The actuation mechanism may assist in engaging (e.g. coupling) and/or disengaging (e.g. decoupling) the head 28.

As discussed further herein, the head portion 28 may include a substrate that may also be referred to as a cleaning substrate or cleaning sponge or surface cleaning portion 84. The substrate 84 may include or be engorged with a cleaning composition, such as a solution. The cleaning material may be selectively released during use of the head 28. In various embodiments, the cleaning composition releases from the substrate when the cleaning head 28 contacts water.

The head 28 may further includes a fitment or engagement region 88. The fitment 88 may be a selected shape, such as annular. The fitment 88, as discussed further herein, may be engaged into a selected portion of the cleaning sponge 84, such as with an internal wall 92 that defines or forms a recess in the substrate 84. The internal wall 92 may define or form an internal diameter having a selected diameter, such as a diameter 96, into which the fitment 88 may be placed. The diameter 96 may be an appropriate diameter, such as to receive and/or engage the fitment 88 and may include a dimension of about 0.5 centimeters (cm) to about 10 cm but may be selected to have a dimensions that are about 10% to about 200% of above noted dimensions. The fitment 88 may be fixed relative to the cleaning sponge portion 84, and in a selected manner, as discussed further herein.

The mechanism 80 may be operated with the control button 40 to move selected portions of the mechanism 80 relative to the external wall 50 up the handle 24. As discussed above, in various embodiments, the wall 50 may be formed as a clamshell, including two portions such as a first portion 50*a* and a second portion 50*b*. The wall 50, however, including either the two portions 50*a*, 50*b*, or a selected number or portions, may be provided to form the wall.

Generally the wall 50 may include a hollow or selectively hollow interior structure to allow the mechanism 80 to operate within the walls 50 of the handle 24. In various embodiments, the wall 50 may be substantially hollow or include an outer wall surface with one or more reinforcing or stabilizing ribs 100. The stabilizing ribs 100 may extend from an internal surface 104 of the wall 50 toward a central portion or region which may substantially define an opening or passage to allow for movement of a control rod or rod member 110 of the mechanism 80. The rod 110 may pass through the supports 100 to a selected portion of the mechanism 80. In various embodiments, for example, the supports 100 include one or more grooves or passages 114 in which the rod 110 may be held, guided or allowed to pass or move.

In various embodiments, the control button 40 may engage or be fixed to a selected end, such as a first or distal end 120 of the rod 110. The control member or button 40 may be fixed to the end 120 in a selected manner, such as with an adhesive, by welding, a snap or interference fit, or other selected fixation mechanisms. It is understood, however, that the control button 40 may be fixed to the end 120 in any appropriate manner to allow a user to engage the button 40 and move the rod 110.

The control button 40 may include a track or groove 130 that may engage or receive a finger or projection 134 from one or more of the wall portions 50. The projection 134 engaging the groove 130 may assist in directing and controlling movement of the control button 40. Accordingly, the control button 40 may generally move in a substantially longitudinal axial direction, such as generally defined by the projection 134 such as in the direction of the arrows 138*a, b*. The movement or the control button 40 may allow or control movement of the mechanism 80 within the assembly 24. Thus, the handle assembly 24 may be operated by a user, such as with a single hand with a single digit engaging the control button 40, to engage and disengage the head portion 28 from the handle portion 24. Thus, the head 28 may be selectively coupled and decoupled from the handle 24.

In the actuation mechanism 80, the rod 110 may be engaged in or to a locking finger or finger assembly 150. The finger assembly 150 may include a hub or a central region 154. The hub 154 may include a depression or bore 158 to engage or receive an end (e.g. a proximal end) 162 of the rod 110. Accordingly, the rod 110 may extend from the end 120 substantially near or connected to the controller button 40 to the end 162 that may be engaged or received in the bore 158 of the locking finger assembly 150. The hub 154 may be a through bore or a blind bore, and the rod 110 may be engaged within the bore 158 of the hub 154 in a selected manner, such as with adhesives, a set screw, a through pin, or other appropriate engagement mechanism. Nevertheless, as discussed further herein, the rod 110 may apply a force to the locking finger assembly 150 for various purposes.

The locking finger assembly 150 may further include a table or ring 160 from which the hub 154 extends. The hub 154 may also include a second side or projection portion 154*a* that extends on a second side of the table 160. Further, the table may include one or more projections, such as a first tab 164 and a second tab 166. The tabs 164, 166 may engage grooves or tracts 170, 174 in the wall 50, such as the respective sides of the wall 50*a*, 50*b*. The tabs 164, 166 engaging the tracts 170, 174 may assist in directing the locking fingers or engaging fingers 150 in a selected direction. As discussed above, the rod 110 may be moved by the control button 40 generally in the direction of the arrows 138*a,b*. Accordingly, the rod 110 may engage the locking finger assembly 150 and also move it generally in the direction of the arrows 138*a,b*. The tracts 170, 174 may assist in directing and controlling movement of the locking finger assembly 150 generally in the axial direction or in a direction selected for engaging and disengaging the head assembly 28.

The locking finger assembly 150 further includes one or more projections, in various embodiments four projection or legs 180, 182, 184, 186 are included. It is understood, however, that the locking assembly may include more or less than the four fingers or legs 180-186 and four is merely exemplary for the current discussion. Further, each of the fingers or projections 180-186 may include substantially similar construction and actuation, therefore, discussion of a single one herein is understood to refer to all of the fingers 180-186. For example, with reference to FIG. 12, the leg or projection 182 may include a body portion or extending portion 190 and a tapered or engaging portion 194. The tapered portion 194 may taper from a distal or engaging end 196 to a wide or enlarged end 198. The end 194 may engage a ramp surface 202 that is formed as or on a projection or finger 206 that extends from the wall or walls 50.

The ramp surface 202 may form an internal structure within the handle assembly 24 to assist in moving the locking finger assembly 150, as discussed further herein. For example, each of the fingers may be in an expanded position, such as away from a central axis 208, as illustrated in FIG. 12. As discussed further herein, however, the locking fingers 180-186 may generally be compressed or moved toward the central axis 208, such as generally in the direction of an arrow 212 by the end portion 194 engaging the ramp surface 202. Thus, the fingers, such as the finger 182, may move radially toward the central axis 208 when moved generally toward the head 28 by movement of the rod 110, which is in turn moved by the control button 40.

The finger assembly 150 may be formed of selected materials and in a selected manner, to assist in allowing for resilient flexing and rebounding of the fingers 180-186. Accordingly, the fingers 180-186 may elastically deform by moving along the ramp surface 202 to allow for engaging and disengaging a plurality of the heads 28. In various embodiments, the locking finger assembly 150 may be formed as a single member, such as in a single molded portion, of a selected material such as Polypropylene, Nylon, combinations thereof, or other appropriate materials.

The mechanism assembly 80 further includes a disengaging assembly or member which may also be referred to as an ejector 220. The ejector 220 may include a ring or body portion 224 from which extends one or more projections 226. As illustrated in FIG. 10, the projections 226 may include four projections, which may be referred to herein by the projections 226, augmented by a lowercase letter. The projections 226 extend from the ring 224 and may engage one or more portions of the fitment 88, such as an upper surface that may be referred to as a flange or a collar 258. The collar 258 may define or form a surface or collar surface that may be engaged by ends of the projections 226. The ejector 220 may assist in removing or disengaging the head 28 from the handle assembly 24, as discussed further herein. An external flange or collar portion 228 may be fixed to the pad or substrate 84 and be formed or be a part of the fitment 88.

The mechanism 80 may further include a guide or support member 232. The support 232 may include one or more bores 236 to assist in supporting or positioning the projections 226 that extend from the body 224. It is understood that the support 232 is optional and illustrated for the current discussion. The support member 232 may be provided to assist in ensuring positioning of the projections 226 for removal of the head 28 and/or engagement of the head 28. Other mechanisms and/or material selection for the ejector 220 may reduce or eliminate any support that may be selected to be provided by the support member 232.

The support 232, however, may also include a central bore or passage 238. The central bore or passage 238 may allow for passing of a second rod or plunger 250. Again, the support 232 need not be included. The plunger 250 may be engaged within the hub 154 of the finger assembly 150.

As discussed above, the hub 154 may include a second hub portion 154*a* and the plunger 250 may be engaged in the hub portion 154*a*. It is understood, however, that the hub portion 154 may define the bore 158 that is a through bore. Accordingly, the rod 110 may be passed through the bore 158 as may the plunger 250. The rod 110 and the plunger 250 may then be connected, such as fixedly connected, after being positioned through the finger assembly 150. In various embodiments, for example, a pin, rivet, adhesive, or other appropriate mechanism may be used to fix the plunger 250 and the rod 110 to each other and/or the finger assembly 150. In various embodiments, for example, the plunger 250, the rod 110, and the finger assembly 150 may be sonic welded together.

The plunger 250 may be positioned within the handle assembly 24 and movable relative to the wall 50 of the handle assembly 24, such as generally in the direction of the arrows 138*a* and 138*b*. Movement of the plunger 250 may allow it to engage and disengage from a locking member 254. The locking member 254 may engage the fitment 88, such as at a ledge or a projection 258, as illustrated in FIG. 12. The locking member 254 may engage the projection or ring 258 to assist in holding the head 28 relative to the handle 24. Engagement and disengagement with the locking member 254 will be discussed further herein.

The locking member 254 may also be referred to as an expandable collar. The locking member 254, as discussed herein, may expand to engage and couple the head 28 to the handle 24. In various embodiments, the locking member 254 may be fixed to the support member 232. The support member 232 may be held or fixed within the handle assembly 24, such as within a groove 262. The support member 232, therefore, may provide a solid base for engaging or moving the locking member 254 relative to the handle 24. It is understood, however, that the support member 232 need not be a separate member from the wall assembly 50. In various embodiments, the locking member 254 may be formed from a selected flexible material.

In various embodiments, the locking member 254 may include or be formed of a silicone. In various embodiments, the entire locking member 254 may be formed of silicone and/or may be formed of more than one material. THE locking member 254 may be formed of a material that sheds and/or is generally impervious to water.

The plunger 250 may move relative to the locking member 254 to allow the locking member 254 to expand and engage or couple the head and to contract the locking head 254 to allow disengagement or decoupling of the head 28. As illustrated in FIG. 12 and discussed further herein the plunger 250 may move to allow the locking member 254 to expand. In various embodiments, the locking member 254 may include a support ring or member 270. The support ring 270 may include one or more indents or grooves 274 to engage or hold one or more projections 278 of the locking member 254. Accordingly, the locking member 254 may include a locking or engaging portion 280 and a support or fixed portion 284 which may be fixed to the support ring 270 and/or the handle wall 50. Thus, the locking member 254 may include selected portions, such as the flexible or locking portion 280, which may move relative to other portions.

The locking portion 280 in the locked or engaged configuration, as illustrated in FIG. 12, may have a selected dimension 283. The selected dimension 283 may be any appropriate dimension such as greater than about 2 centimeters (cm) to about 15 cm, including about 2 cm to about 8 cm, and further including about 3 cm to about 6 cm. The locking portion 280 may be sized to engage the fitment 88, as illustrated in FIG. 12, to ensure that the head portion 28 remains engaged and secure during cleaning and use.

The mechanism 80 may further include a biasing member 290. The biasing member 290 may include any appropriate mechanism, such as a coil spring. The biasing member 290 may bias the locking finger assembly 150 in a selected position, such as away from the ejector 220 and/or the locking member 254. The biasing member 290 may engage the table 160 of the finger assembly 150 and/or another selected portion, such as the support 270 and/or the locking member 254. Thus, the biasing member 290 may bias the mechanism 80 in a locked or connected configuration, wherein the plunger 250 is away from the locking member 254 and the locking member 254 is expanded to engage the head 28. The biasing force of the biasing member 290, however, may be overcome by movement of the control button 40, generally in the direction of the arrow 138*a*. The biasing member 290, however, may bias the mechanism 80 generally in the direction of the arrow 138*b*. This allows the mechanism 80 to be biased in a first configuration, such as a locked configuration, and this may be overcome with an actuation of the mechanism 80, such as by the user, actuating the button 40.

Figure 13:
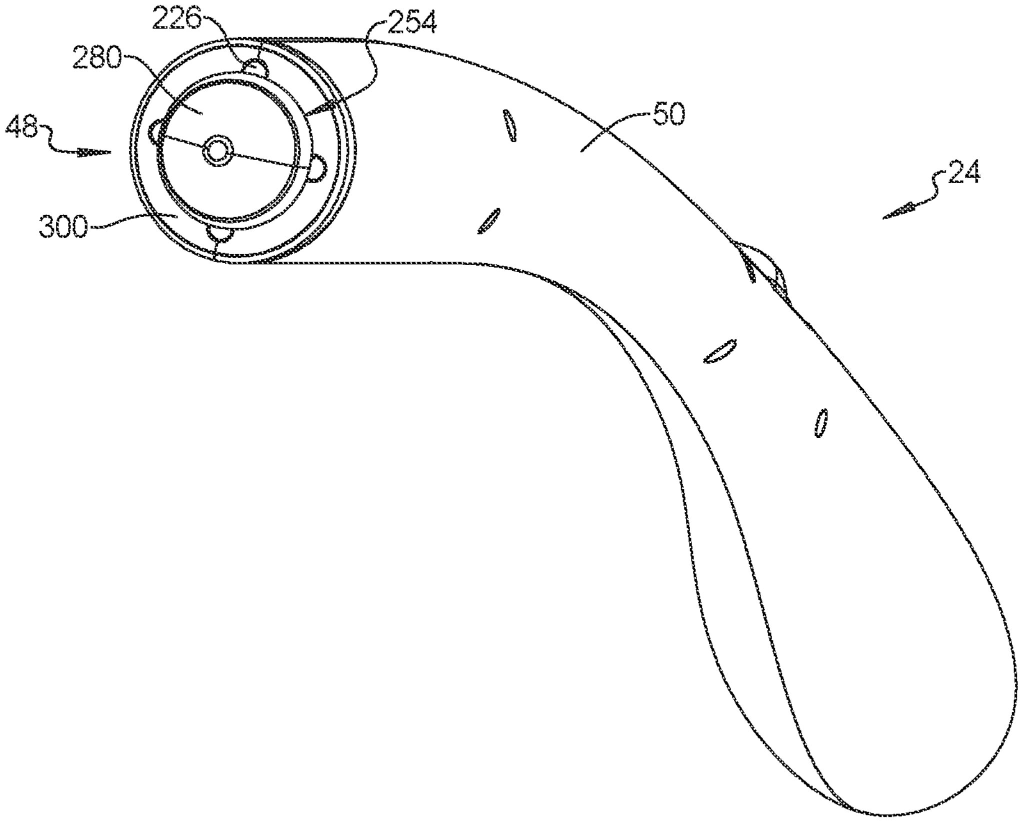
FIG. 13 is a detail end view of a handle assembly of FIG. 1.
Figure 14:
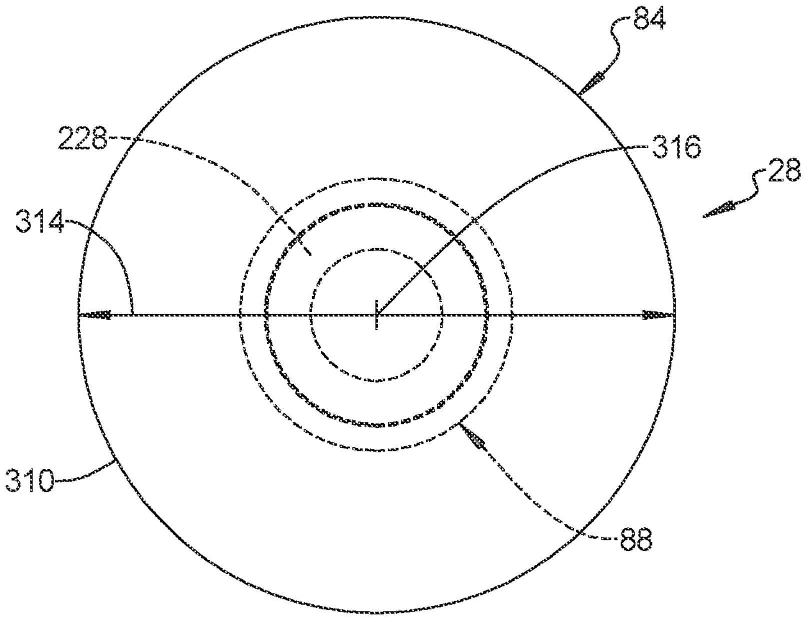
FIG. 14 is a top plan view of a head assembly.
Figure 15:
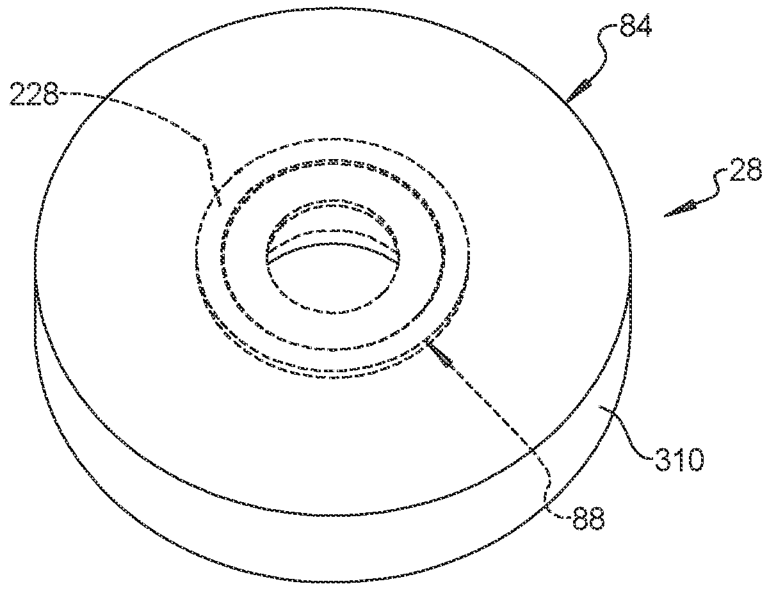
FIG. 15 is a top perspective view of the head assembly of FIG. 14.
Figure 16:
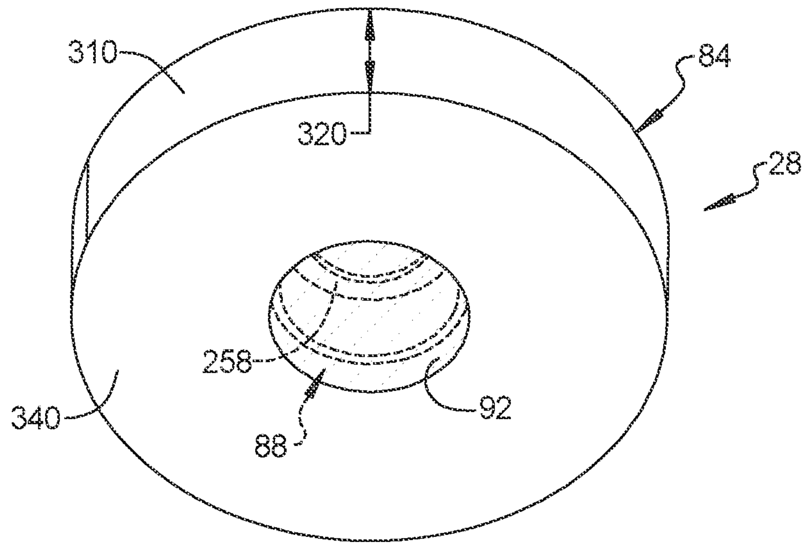
FIG. 16 is a bottom perspective view of the head assembly of FIG. 14.
Figure 17:
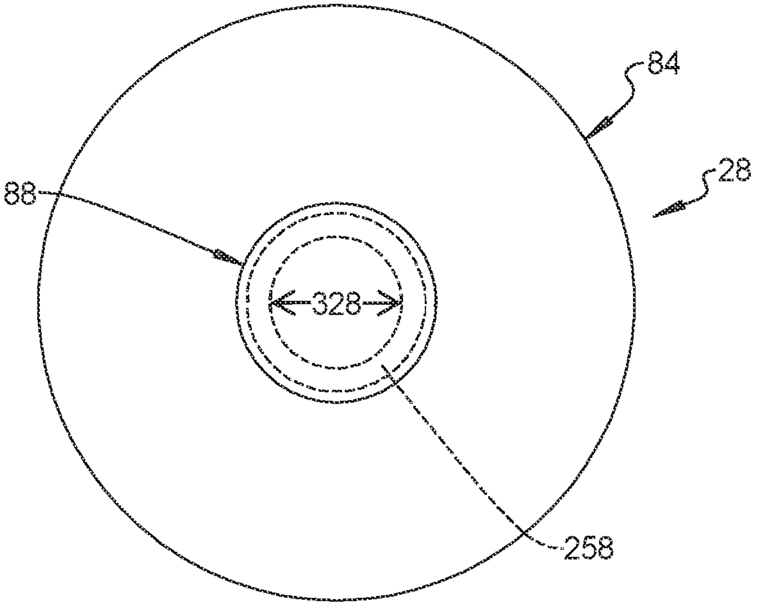
FIG. 17 is a bottom plan view of the head assembly of FIG. 14.

Turning reference to FIG. 13, a detailed engaging end view of the handle assembly 24 is illustrated. As illustrated, the projections 226 may be withdrawn relative to the handle wall 50 such that the projections 226 are substantially flush and/or withdrawn into the wall near the connection region 46. Generally, the connection region 46 may include a distal or connection end wall 300. When in use, the head 28 may be substantially held against the end wall 300 to assist in stabilizing the head 28 relative to the handle assembly 24.

Turning reference to FIGS. 14, 15, 16 and 17, the head assembly 28 is illustrated in detail and alone. Generally, the head assembly 28 may be provided in any selected shape, but may include a substantially cylindrical or circular outer wall 310. When the head assembly 28 is provided with the cylindrical or circular outer wall 310 it may include a selected diameter 314 that extends through a center 316 of the head assembly 28. The diameter 314 may be any appropriate dimension, such as about 2 centimeters (cm) to about 20 cm, including about 5 cm to about 10 cm, and further including about 7 cm to about 8 cm. Further the head assembly 28 may include a height 320. The height 320 may be any appropriate dimensions, such as about 0.5 cm to about 10 cm, including about 0.5 cm to about 5 cm, and further including about 1.2 cm to about 3 cm. Various dimensions may generally have a tolerance of about 0.01 millimeters to about 0.5 cm. It is understood, however, that the head 28 may be formed in appropriate shapes that may include selected maximum dimensions similar to those noted above.

Generally, the head assembly 28 includes the pad or cleaning portion 84 that is held or fixed relative to the fitment 88. The connection of the pad 84 to the fitment 88 may be in any appropriate manner such as with an adhesive, welding, friction or interference fit, or the like. The fitment 88 may include a flange 228, as discussed above, that is fixed (such as with an adhesive) to a top wall 344 of the pad 84.

Further, the fitment 88 may generally be positioned in a bore or depression of the pad 84 defined by the internal wall 92. The internal wall 92 may define the bore in which the fitment 88 is positioned. The internal wall 92 may define a dimension or diameter 96 that may be any appropriate diameter. For example, the diameter 96 may be 2 centimeters (cm) to about 15 cm, including about 2 cm to about 8 cm, and further including about 3 cm to about 6 cm. Generally, the fitment 88 may be substantially rigid while the cleaning or sponge portion 84 may be resilient, but includes some flexibility and/or abrasiveness. In various embodiment, for example, the fitment 88 may be adhered to the internal wall 92 of the sponge or pad portion 84. The head 28 may therefore be engaged and disengaged from the engagement end 46 of the handle assembly 24.

Figure 18:
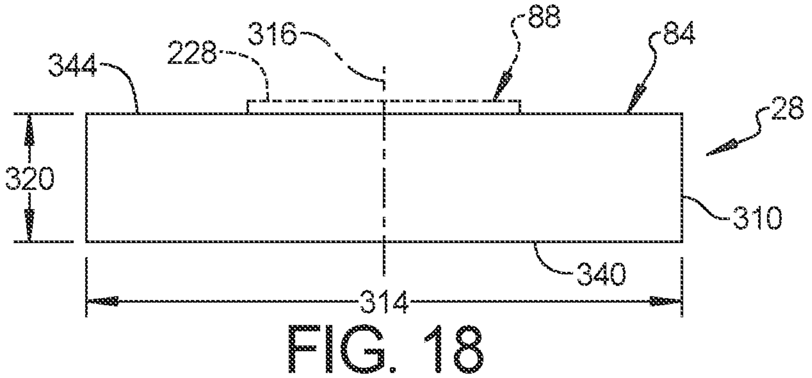
FIG. 18 is a side plan view of the head assembly of FIG. 14.

As illustrated in FIGS. 14-17, the head 28 may be substantially annular including an annular ring or portion in which the fitment 88 is fixed. It is understood, therefore, that the top and bottom of the pad may be substantially identical to one another as may be a side view of the outer circular wall 310 of the pad 88. The head 28, therefore, may be substantially symmetrical on all sides, when looked at from a side view, as illustrated in FIG. 18. Further, the fitment 88 may be provided in any appropriate configuration, and may be formed integrally or as a single member with the sponge portion 84. Accordingly, the head assembly 28 may also be substantially symmetrical when viewed from both the top and bottom view.

As discussed and illustrated above, the handle assembly 24 may be operated, such as with the control button 40, via the mechanism 80 to engage and disengage the head 28 from the handle assembly 24. This may allow the head 28 to be used for a selected period of time when engaged to the handle assembly 24 and then disengaged therefrom. Further, this may also allow the handle 24 to be used for a plurality of uses with a plurality of different heads 28. Further, the fitment 88 may be selectively included or not included in the head assembly 28, according to various embodiments. Nevertheless, the fitment 88 may also be provided substantially symmetrical to extend a selected distance into the pad portion 84. In various embodiments, the pad assembly 24 may be substantially solid at a region opposite the engagement or the collar portion 258 of the head assembly 28. The pad portion 84, for example, as illustrated in phantom in FIG. 16, may extend over or past the internal wall 92 such that the pad portion 84 forms a substantially solid surface on a bottom or outside surface 340 of the pad 84. The bottom surface 340 may be opposed to a top surface 344 which may be substantially near the engagement region 46 of the handle assembly 24, when the head assembly 28 is engaged. It is understood, however, that the top and bottom is merely for clarity of the current discussion.

Returning reference to FIG. 12 and with additional reference to FIG. 19, the operation of the assembly 20 will be described in detail. As discussed above, the cleaning assembly or assembly 20 may include a locked, also referred to as an engaged or coupled, position where the head 28 is fixed or held relative to the engaging portion 46 of the handle assembly 24. The locked position includes the plunger 250 held in the up or biased position by the spring 290, generally in the direction of arrow 138*b*. The plunger assembly 250, therefore, generally does not engage or press against the locking portion 254 in the locked position, as illustrated in FIG. 12. Thus, the locking member 254 is expanded in a generally relaxed configuration of the locking member 254. As understood by one skilled in the art, the locking member 254 may be formed to elastically return to the locked or expended position as illustrated in FIG. 12. In the locked or engaged position, the locking fingers 180-186 of the locking finger assembly 150 are retracted into the handle assembly 24 such that the distal end 194 of the fingers 180-186 are substantially held by the projection 206 and generally on the surface 202. The ejector 220 is also withdrawn into the handle 24. Thus, in the locked position, the locking member 254 is generally relaxed into a locked position to engage the fitment 88, such as including the flange 258, of the head assembly 28.

Figure 19:
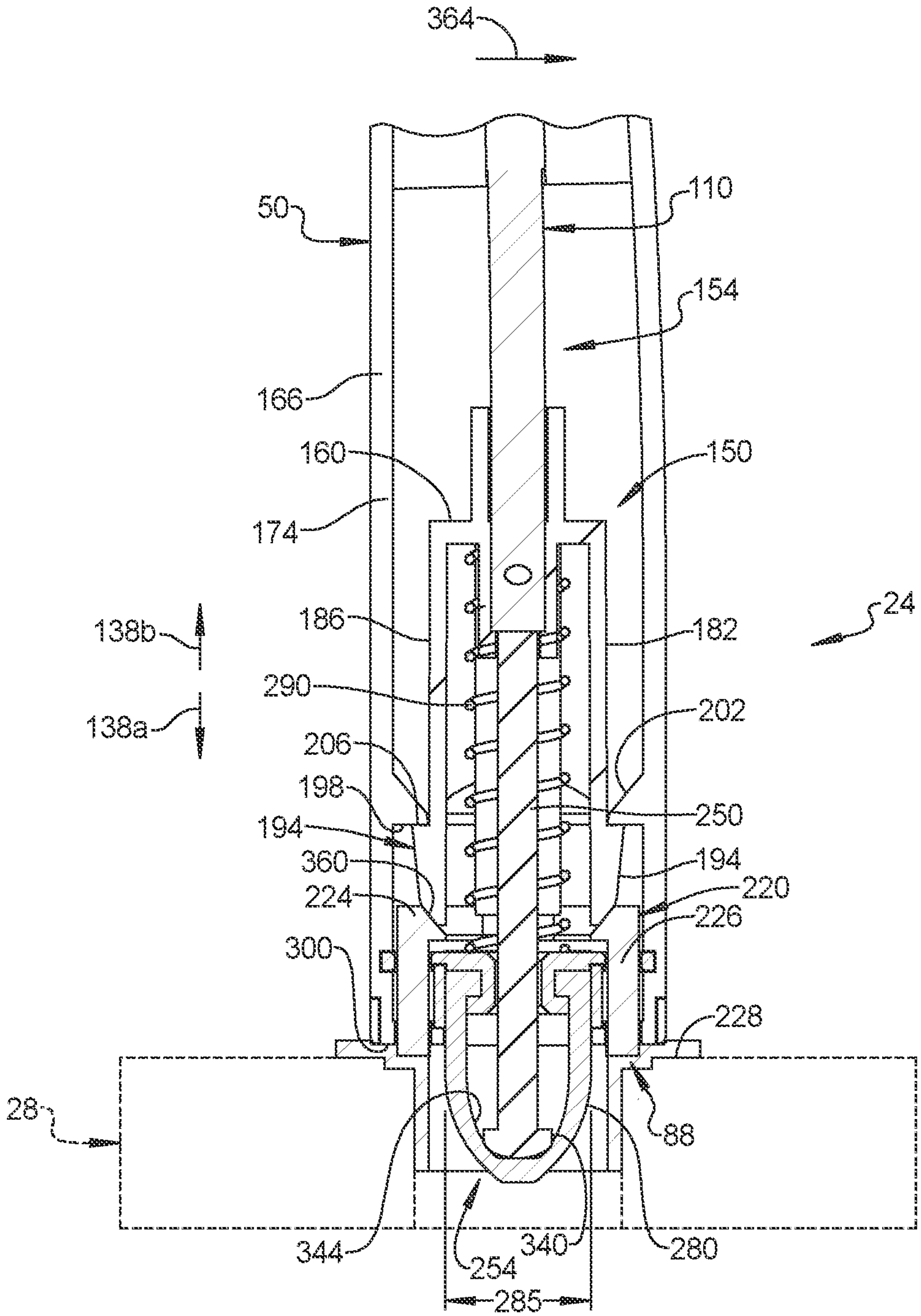
FIG. 19 is a partial detail view of a disengaging position of the handle assembly of FIG. 5.
Figure 23:
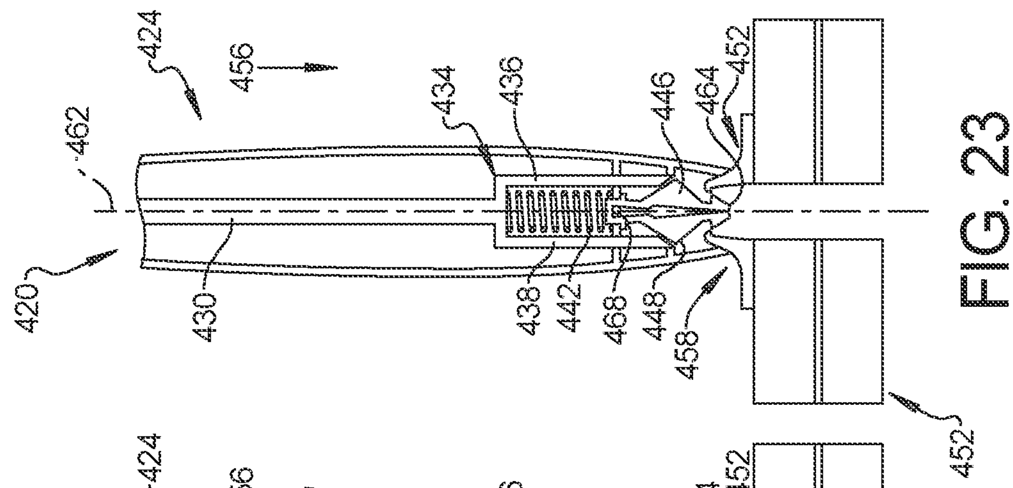
FIG. 23 is a detail cross-sectional view of a handle and head assembly in a disengaging position, according to various embodiments.

To disengage, also referred to as unlock, decouple, or unfixed, the head assembly 28 from the handle assembly 24 and/or prepare the handle assembly 24 for receiving a new head assembly 28, the handle assembly may be moved into an unlocked position, as illustrated in FIG. 19. To move the handle assembly into the unlocked position, the control button 40 may be moved generally in the direction of arrow 138*a*. Moving the control button 40 generally in the direction of arrow 138*a* moves the rod 110 and the plunger 250, generally in the same direction.

Moving the plunger in the direction of arrow 138*a* pushes the plunger 250, including a plunger or engaging end 340 into and/or onto an inner surface 344 of the locking member 254. As discussed above, the locking member 254 may be formed of a flexible or pliable material and therefore the locking member 254 may be moved to an unrelaxed or contracted position such that the locking portion or region 259 is not able to engage the fitment 88. The locking member 254, therefore, may be disengaged from the head 28 and the head 28 may be free relative to the handle assembly 24.

The locking portion 280 of the locking member 254 may have an unlocked or disengaged dimension 285. The unlocked dimension may generally be smaller than an internal diameter 328 of the fitment 88. Thus, the dimension 285 may generally be about 2 centimeters (cm) to about 15 cm, including about 2 cm to about 8 cm, and further including about 3 cm to about 6 cm. The dimensions may also vary about or selected to differ from the specific range by about 10% to about 200%.

When in the unlocked configuration, the rod 110 may move the fingers 150 also generally in the direction of arrow 138*a*. The fingers may move along the ramp surface 202 and into engagement with the ejector 220. The ejector 220 may, therefore, also generally move in the direction of arrow 138*a*. The ejector legs or fingers 226 may then extend beyond the end surface or wall 300 and engage the fitment 88, such as generally at the collar 258. Movement of the projections 226 against the collar 258 may assist in removing the head 28 from the handle assembly 24.

Therefore, the mechanism 80 may unlock and remove the head assembly 28 from the handle assembly 24. The rod 110 may be moved to move the finger assembly 150 to move the end portions 194 along the ramp surface 202 to allow them to engage the ring or body 224 of the ejector 220. Further, movement of the rod 110 moves the plunger 250 to flex the locking member 254 to an unlocked position, as illustrated in FIG. 19. Thus, the head 28 may be unlocked and the projections 226 may eject the head 28 from the handle assembly 24.

Also, in the unlocked configuration, the end portions 194 may move along the ramp surface 202. When moved to the selected or held position, the enlarged ends or surface 198 may then be held of engage the projection 206. The finger assembly 150 may, therefore, be held in the unlocked or disengaged configuration to ease in removal of the head assembly 28 and a ready position for receiving a new head 28. Also, the ejection projections 226 may extend from the end wall 300 in the disengaged or decoupled configuration.

To re-engage the head or to install a new head assembly on the handle assembly, the handle assembly 24 may be moved toward the head assembly 28 and/or the head assembly 28 may be moved towards the handle assembly 24. For example, the head assembly 24 may be moved toward the handle assembly 24 generally in the direction of arrow 138*b*. In various embodiments, however, the handle assembly 24 may be moved toward the head 28 in the direction of the arrow 138*a*. Regardless, the collar 258 of the fitment 88 may engage the projections 226 of the ejector 220. By continuing movement of the handle assembly 24 toward or closer to the head assembly 28, the fitment 88 compresses or moves the ejector assembly 220 generally in the direction of the arrow 138*b*, as illustrated in FIG. 19. Movement of the ejector assembly 220 in the direction of arrow 138*b* compresses or moves against the fingers 180-186, such as the ends 194 thereof. The body 224 may also include a selected ramp surface 360 that assists in moving the ends 194 generally toward the plunger 250, in a manner similar to the ramp surface 202.

The movement of the ends 194 may disengage the proximal ends 198 of the end region 194 from the projection 206 from the wall 50. When in the unlocked position, the locking fingers of the assembly 150 may be held due to the interaction of the end 198 of the end region 194 of the finger and the projection 206. Compressing the fingers disengages the end 198 from the projection 206. The ramp surface 360 assists in moving the fingers generally toward the plunger 250, such as generally in the direction of arrow 364. Thus, the holding or finger assembly 150 may also move in the direction of 138*b* and be assisted by the biasing member 290 in so doing.

Further, as discussed above, the plunger 250 is also held or fixed relative to the locking assembly or fingers 150 and may also move in the direction of arrow 138*b* once the fingers 180-186 are disconnected from the projection 206. The biasing member 290 may, therefore, assist in moving the plunger 250, also in the direction of arrow 138*b* to move the locking member 254 to the locked position or orientation, as illustrated in FIG. 12.

Accordingly, the biasing member 290 may assist in moving the plunger 250 and the finger assembly 150 generally to the locked position once the ejector 220 has moved the fingers 180-186 enough, such as generally in the direction of arrow 364, to disengage the projection 206 from the end 198 of the end regions 194 of the fingers 180-186.

The handle assembly 24, therefore, may then be held in the locked position with the biasing member 290, as discussed above. The ejector assembly 220, therefore, may also assist in the ejection or removal of the head assembly 28 from the handle assembly 24 and/or the engagement of a head assembly 28 to the handle assembly 24, as discussed above.

In addition to the above described embodiments, various alternative and/or additional features and/or embodiments may be included with the assembly 20. Various features may include a connection with a handle assembly 424. With reference to FIGS. 20, 21, 22, and 23, the handle assembly 424 is schematically illustrated. It is understood that the handle assembly 424 may include portions similar to those discussed above for the handle assembly 24 and only additions or differences may be described here.

Generally, the handle assembly 424 may include a rod 430 that extends or connects to an ejector assembly 434. The ejector assembly may include one or more ejector legs such as a first ejector leg 436 and a second ejector leg 438. The two ejector legs may extend from the rod 430 and partially or entirely encompass or surround a biasing member, 442, such as a spring. The biasing member may hold the handle assembly 424 at a rest position, as illustrated in FIG. 20.

Figure 22:
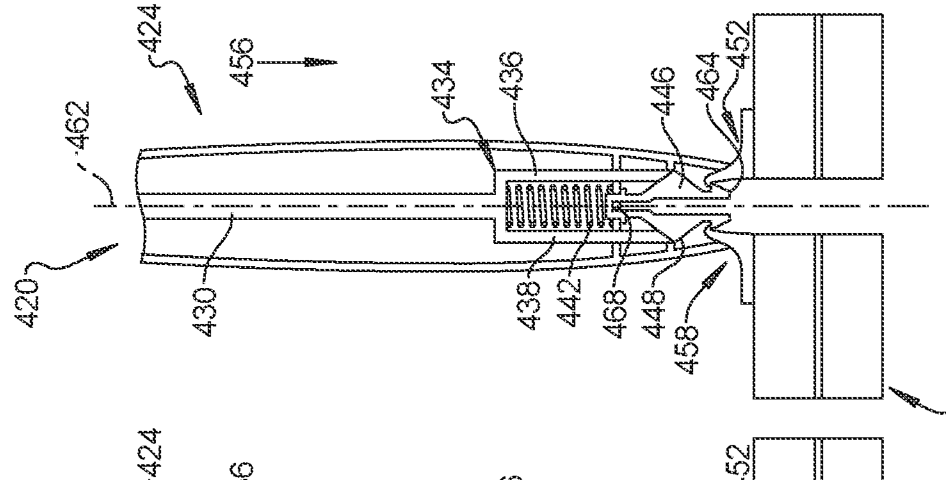
FIG. 22 is a detail cross-sectional view of a handle and head assembly in a locked configuration, according to various embodiments.
Figure 21:
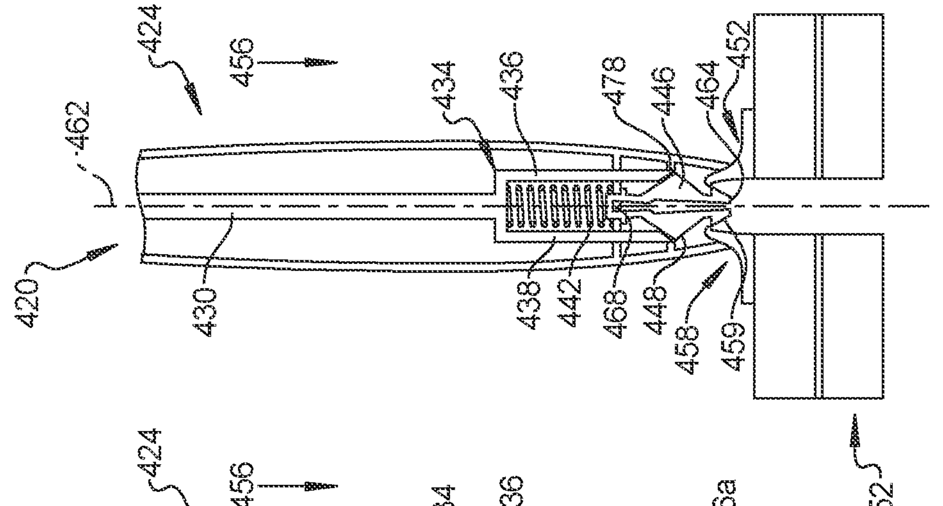
FIG. 21 is a detail cross-sectional view of a handle assembly and a head assembly in an insertion position, according to various embodiments.
Figure 20:
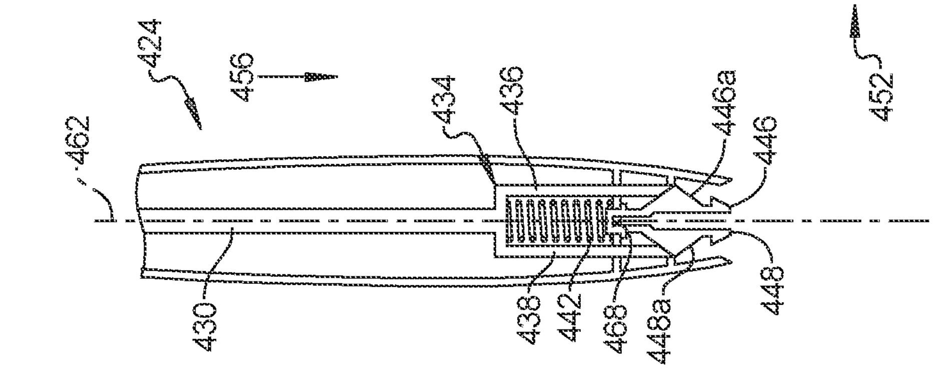
FIG. 20 is a detail cross-sectional view of a handle assembly, according to various embodiments.

The handle assembly 424 may further include engagement fingers or tongs that may be biased in a locked or engaged position, as illustrated in FIGS. 20 and 22. The locking fingers may include a first locking finger 446 and a second locking finger 448. The two locking fingers may engage a head assembly 452, as illustrated in FIG. 21. The handle assembly 424 may be moved generally in the direction of arrow 456 toward a fitment 458 of the head assembly 452. The two locking members 446, 448 may compress toward a central axis or center portion 462 to pass the fitment 458, such as by engaging the fitment. Once a selected distance past the fitment 458, the handle assembly 424 may return to a locked configuration, as illustrated in FIG. 22. A distal end 464 of the locking fingers 446, 448 may pass a portion of the fitment 458 and lockingly engage the fitment 458 in the locked position, as illustrated in FIG. 22.

The locking fingers 446, 448 may also be biased in the locked configuration or position, such as by a living hinge or living hinge portion 468 that may be formed between the two fingers 446, 448. Accordingly, once the distal end 464 of the fingers 446, 448 extends past the fitment 458, the living hinge or biasing portion 468 may bias the fingers 446, 448 in the coupled configuration. The distal ends 464 of the respective fingers 446, 448 may also include tapered or ramped portions 459 to assist in allowing the fingers 446, 448 to compress towards the central axis 462 to assist in insertion into the head 452. In addition, an internal ramp surface 478, similar to the ramp surface 202, may engage the fingers 446, 448. Also, exterior surfaces **446*a*, 448*a* of the respective fingers 446, 448 may assist in movement of the fingers for engaging and disengaging the fitment 452**.

Figure 24:
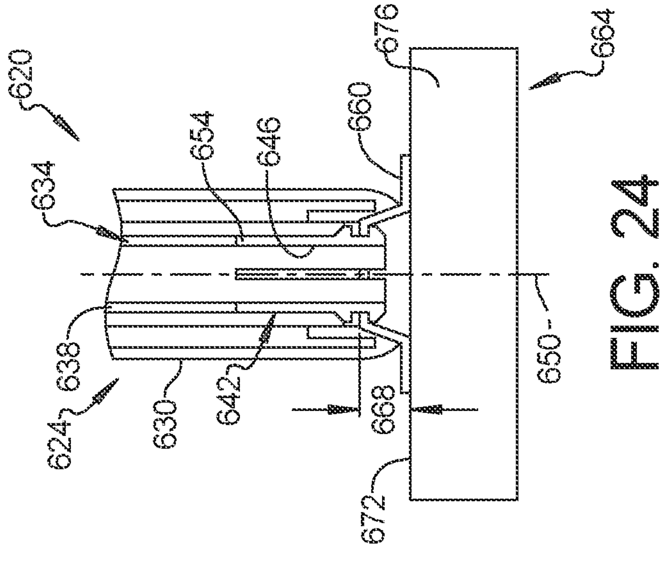
FIG. 24 is a detail cross-sectional view of a handle and head assembly in an engaged position, according to various embodiments.

Once the head 452 is used a selected amount, as discussed above, the head 452 may be ejected or removed from the handle assembly 424. The rod 430 may be pressed generally in the direction of the arrow 456 to move the ejector assembly 434, also generally in the direction of the arrow 456. This may move or press against the fitment 458 of the head assembly 452 by the projections or legs 426, 438 and drive or force the head 452 away from the handle assembly 424, as illustrated in FIG. 24. Thereafter, the fingers 446, 448 may compress again toward the center 462 to release the fitment 458 and the head assembly 452 from the handle assembly 424.

Accordingly, the cleaning assembly 420 may include an alternative and/or additional features for engaging and disengaging a selected head, such as the head assembly 452. As illustrated in FIGS. 20-23, the fitment 458 of the head assembly 452 may be engaged by a selected locking or engaging fingers or tabs, to assist in holding the head 452 relative to the handle assembly 424.

Turning reference to FIG. 24, a handle assembly 624 is illustrated. The handle assembly 624 may include portions similar to those discussed above and/or additional or alternative portions, including those discussed further herein. It is understood, however, that the handle assembly 624 may include portions as discussed above and/or be incorporated with the handle 24 or other handles according to various embodiments, as understood by one skilled in the art. The handle assembly 624 may generally include a wall portion 630 in which a rod or actuation assembly 634 is positioned. The rod assembly 634 may be biased in a locked or holding position, as illustrated in FIG. 24. The rod 634 may generally include a first portion 638 that may be rigid or substantially rigid that extends to a second portion that is generally deflectable or deformable portion 642. The rod 634, including the two portions 638, 642, may be moveable within the wall portion 630.

The deformable portion 642 may include one or more fingers or legs 646 that may move relative to a central axis or region 650. As illustrated in FIG. 24, the fingers 646 may be biased at a hinge or living hinge 654 relative to the first portion 638. The fingers 646 may be biased into the locked position, as illustrated in FIG. 24, to engage a fitment 660. The fitment 660 may include an engaging region that is engaged by the fingers 646. The fitment 660 may be fixed to a head or form a portion of a head assembly 664, similar to the head assembly 28, as discussed above. The fitment 660 may extend a distance 668 above a surface 672 of a head portion 676 of the head assembly 664.

In the engaged position, as illustrated in FIG. 24, the fitment 660 may be received at least partially within the wall 630 of the handle assembly 624. Thus, the engaging portion or fingers 646 may be substantially entirely maintained within the wall portion 630 of the handle assembly 624 during an engaging and disengaging from the head assembly 664. Further, the head portion 676 may be substantially solid and not include any recess or portion for receiving a part of the handle assembly 624.

Figure 25:
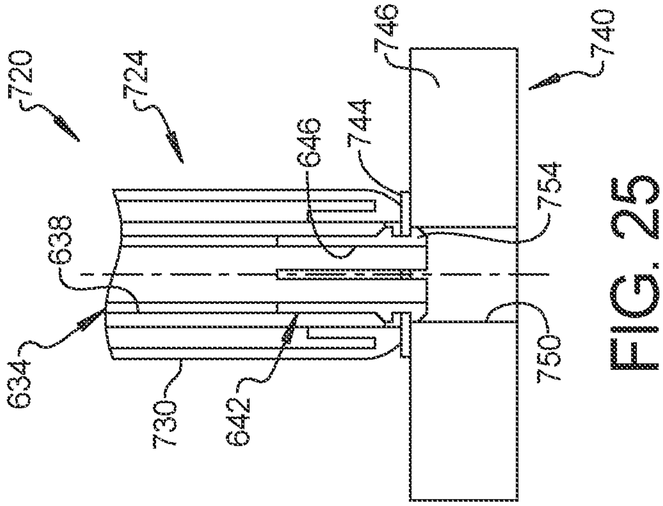
FIG. 25 is a detail cross-sectional view of a handle and head assembly in an engaged configuration, according to various embodiments.

In various embodiments, as illustrated in FIG. 25, a handle assembly 724 is illustrated of a cleaning assembly 720. The handle assembly 724 may be similar to the handle assembly 624, as discussed above. The handle assembly 724, therefore, may include the rod 634 may generally include the first portion 638 that may be rigid or substantially rigid that extends to the second portion that is generally deflectable or deformable portion 642. The handle assembly 724, however, may include a wall 730 that does not include a recess to receive a fitment.

A head assembly 740 may include a fitment 744 that is substantially flat or flush on a head portion 746 of the head assembly 740. The head assembly 740 may include the head portion 746 that includes or defines an inner wall or bore 750.

As discussed above, the finger 646 may be moved to engage the fitment 744 and be received at least partially within the recess or bore 750. As discussed above the finger 646 may deflect a selected amount and include selected distal ramp or tapered portions 754 to assist in engaging and disengaging the fitment 744.

Figure 26:
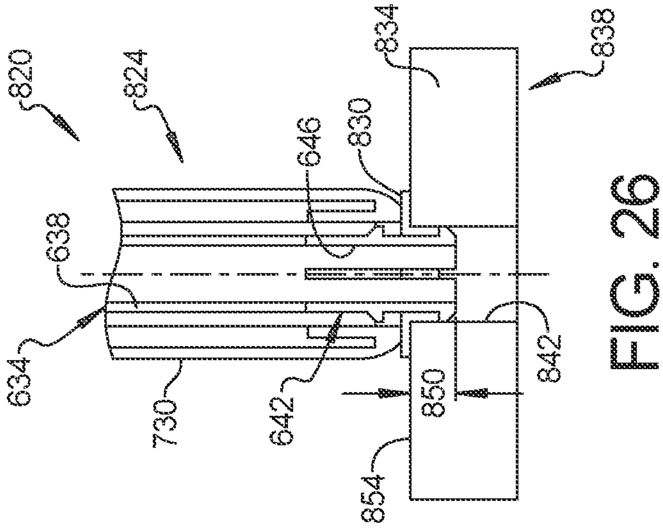
FIG. 26 is a detail cross-sectional view of a handle and head assembly in an engaged position, according to various embodiments.

Turning reference to FIG. 26, a cleaning or operation assembly 820 is illustrated including a handle assembly 824. The handle assembly 824 may include portions similar to those discussed above, such as of the handle assembly 624 and the handle assembly 724. The handle assembly 824 may include a wall 730 and the rod 634 that may generally include the first portion 638 that may be rigid or substantially rigid that extends to the second portion that is generally deflectable or deformable portion 642. The handle assembly 824, as discussed above, may include the finger 646 that may engage a fitment 830.

The fitment 830 may be connected to a head portion 834 of a head assembly 838. The head portion 834 may include or define a bore or internal wall 842 similar to the wall or bore 750. The fingers 646 may receive to engage at the fitment within the bore, such as a selected distance 850 below or within a surface 854 of the head portion 834. Thus, the handle assembly 824 may engage the head assembly 838 with the engaging fingers 642 substantially below an external surface 854 of the head portion 834.

The handle assembly 624, 724, 824 may include portions similar to those discussed above and/or to each other. Each of the handle portions 624, 724, 824 may engage selected head assembly or portions, such as those discussed above for providing cleaning assemblies 620, 720, 820, as discussed above.

Figure 27:
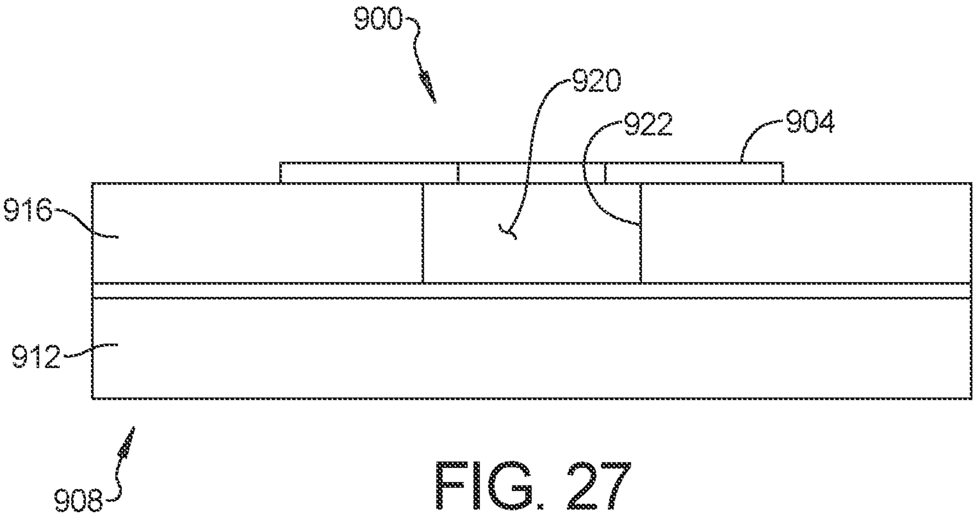
FIG. 27 is a cross-sectional view of a head assembly, according to various embodiments.

Further, various head assemblies according to various embodiments may be provided that are similar or identical to those discussed above and/or include various additional and/or alternative portions. For example, as illustrated in FIG. 27, a head assembly 900 is illustrated. The head assembly 900 may include a fitment 904 that may be engaged with any appropriate engagement portion, including those discussed above. The head assembly 900 may further include a head or scrubbing portion 908.

The head portion 908 may include or be formed of two portions such as a substantially solid or continuous portion 912 and an annular or open portion 916. The two portions 912, 916 may be fixed together in any appropriate manner, such as with an appropriate adhesive, selected welding assembly, or the like. Regardless, the first portion 912 may be substantially continuous and solid relative to the second portion 916 which may include an internal bore or a passage 920. The bore 920 may define an internal wall 922 and the bore 920 may provide a space or volume to assist in engaging the head assembly 900, as discussed above. Accordingly, it is understood that the bore 920 need not pass through the entire head assembly or head portion 908. However, a blind bore, such as the blind bore 920, may be formed by including an entire bore through a first portion and fixing a second portion thereto, forming a partial bore through a selected head portion or member, or any other appropriate manner.

In various embodiments and/or in additional portions of various embodiments, the handle assembly 24 may be provided as multiple pieces along its length. For example, with reference to FIG. 1, the grasping portion 36 may be provided to decouple from the second portion 68, such as generally at a decoupling or separating position that may be formed in a separation region 940. In various embodiments, therefore, the elongated or non-grasping portion 68 may include substantially all of the control mechanism or mechanism 80 for operation of the engagement or coupling portion relative to the head assembly 28. The grasping portion 36 may be removed from the second handle portion to allow for a shortened packaging or shipping assembly. The grasping portion 36 may generally provide additional length to the handle assembly 24, but may not include the mechanism 80 or a portion of the mechanism 80.

Thus, removal of the grasping portion 36 from the rod or handle portion 68 may allow for ease of disassembly or separation for transport and ease assembly by a user prior to use of the cleaning assembly 20. Accordingly, it is understood that the cleaning assembly 20 may include the handle assembly 24 formed as a single member, such as with an elongated wall 50 and/or with a wall 50 that is separated along its length that may be assembled to provide a usable or use length of the handle assembly 24 by a final user. When making the handle assembly 24, or according to any appropriate embodiment, as two pieces certain changes or variations may occur. For example, additional material may be added to the wand 24 at or near the separation region 940 to assist and/or ensure a solid and firm feeling connection. Further, the wand 24 may be straight and/or lack a curve at that separation region 940.

Figure 34:
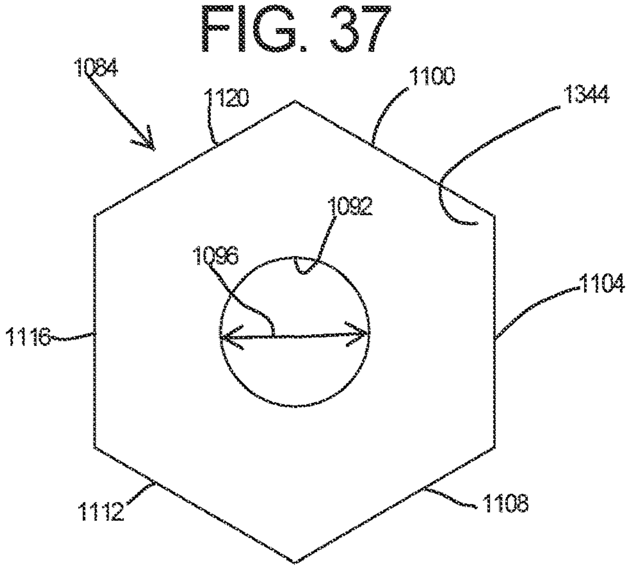
FIG. 34 is a top plan view of a head assembly, according to various embodiments.

In various embodiments, as illustrated in FIGS. 28, 29, 30, 31, 32, and 33, a head assembly 1028 is illustrated. The head assembly 1028 may include portions that are similar to the head assembly 28, as discussed above. For example, the head assembly 1028 may include the fitment 88 that may be fixed to a selected surface or portion, such as a bore 1090 defined by a wall 1092, similar to the bore and wall 92 discussed above. The wall 1092 may define an internal dimension, such as an internal diameter 1096 (FIG. 34). For example, the diameter 1096 may be 2 centimeters (cm) to about 15 cm, including about 2 cm to about 8 cm, and further including about 3 cm to about 6 cm. The fitment 88 may include the same fitment portions and dimensions, as discussed above. For example, the fitment 88 may include the flange or collar 228. The flange 228 maybe fixed to a pad or substrate 1084 of the head assembly and be formed or be a part of the fitment 88.

The fitment 88 may include the similar dimensions and portions as discussed above. The fitment 88 may be sized to interconnect with a surface or wall 1344 of the substrate 1084 of the head assembly 1028. Generally, the fitment 88 may be connected to the substrate 1084 in a manner substantially similar to that as discussed above to allow the head assembly 1028 to operate with the handle assembly 24 in the cleaning assembly 20 similar to the head assembly 28.

The head assembly 1028 may include the substrate 1084 as a single unitary member and/or a plurality of portions including a first substrate portion 1084*a*, a second substrate portion 1084*b*, and a third substrate portion 1084*c*. The three substrate portions 1084*a*, 1084*b*, 1084*c* may be formed together in a selected manner. The different substrate portions may include different materials and/or compounds. For example the second substrate portion 1084*b* may include a cleaning compound loaded thereon. It is understood that head assemblies according to any of the various embodiments may include a plurality of layers of substrate, as illustrated here.

Figure 32:
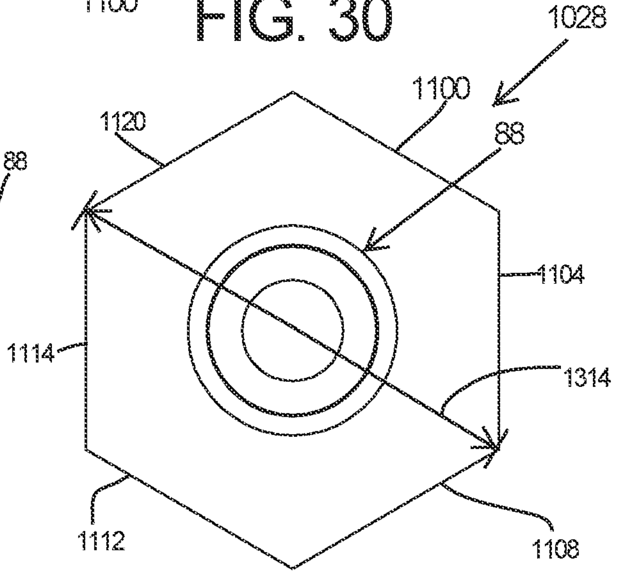
FIG. 32 is a top plan view of the head assembly of FIG. 28.
Figure 33:
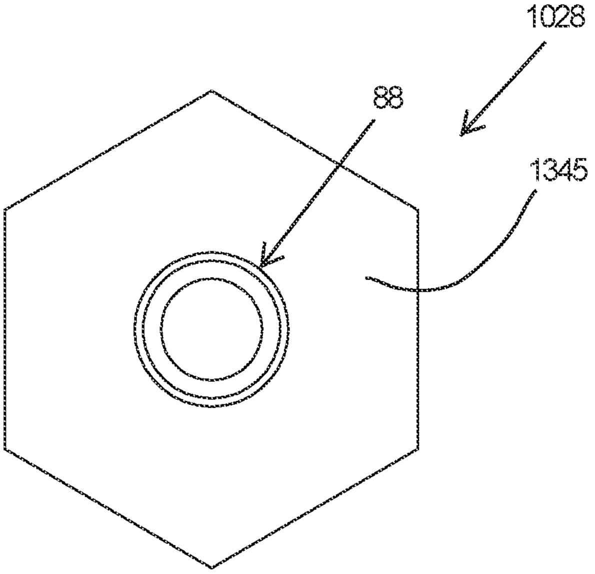
FIG. 33 is a bottom plan view of the head assembly of FIG. 28.

Further, the head assembly 1028 may include a selected polygon configuration, such as a hexagon polygon configuration. As illustrated in FIGS. 32 and 32, the head assembly 1028 may include six sides such as a first side 1100, a second side 1104, a third side 1108, a fourth 1112, a fifth side 1116, and a sixth side 1120. The hexagon shape including the six sides is 1100-1120 may form an exterior perimeter of the head assembly 1028. The sides 1100-1120 may be substantially flat over a height 1130 of the head assembly 1028.

The sides 1100-1120 may all have an equal dimension such as a dimension 1134 that extends between the two adjacent vertices, such as a vertex 1136 and a vertex 1138 of the side 1100. The height 1130 may be a height similar to the height 320, as discussed above including about the 0.5 cm to about 10 cm, including about 0.5 cm to about 5 cm, and further including about 1.2 cm to about 3 cm. The dimension 668 may be about 2 cm to about 13 cm, including about 2 cm to about 5 cm, and further including about 3.5 cm to about 4 cm.

The head assembly 1028 may include a maximum dimension 1314 between opposing vertices of the head assembly 1028. The dimension 1314 may be similar to the dimension 314 as discussed above including about 5 cm to about 25 cm, including about 5 cm to about 10 cm, and further including about 7 cm to about 8 cm. Accordingly, the head assembly 1028 may include the maximum dimension 1314 that is substantially identical to or similar to the diameter or maximum dimension 314 of the head assembly 28. This may also allow the head assembly 1028 may also be packaged in a dimension similar or identical to the head assembly 28.

Figure 28:
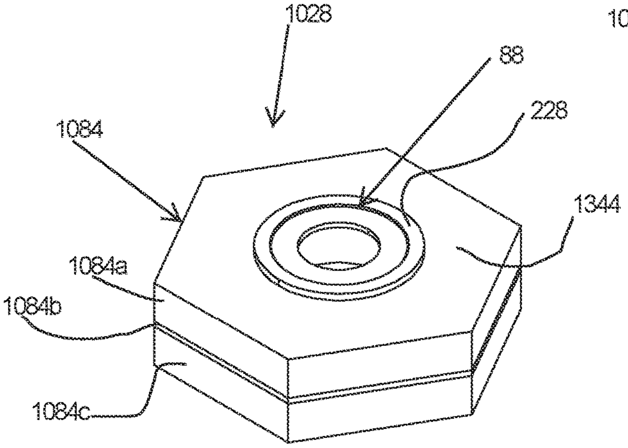
FIG. 28 is a top perspective view of a head assembly, according to various embodiments.
Figure 29:
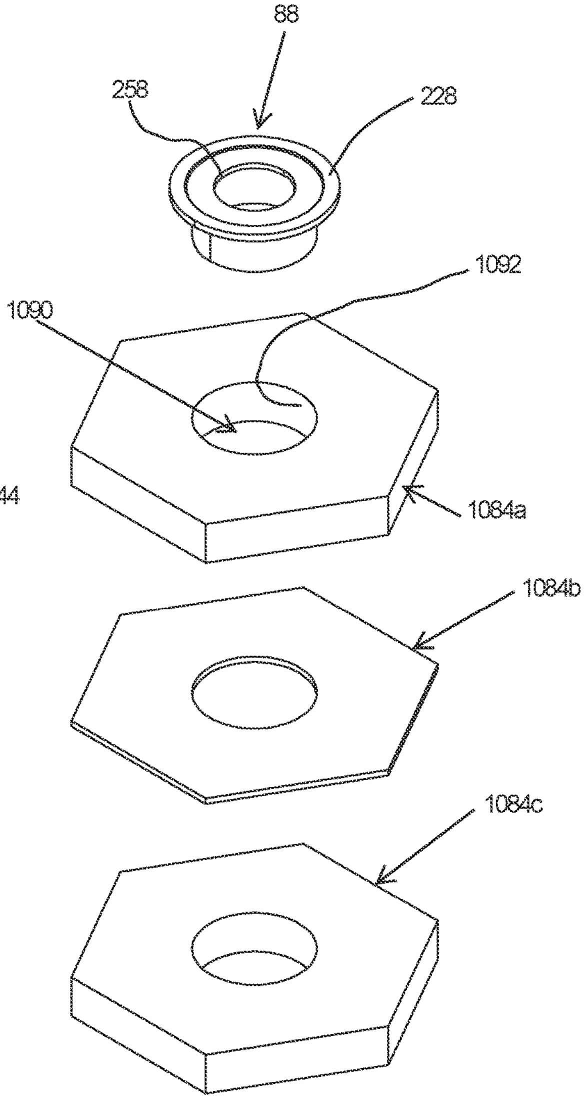
FIG. 29 is an exploded view of the head assembly of FIG. 28

The head assembly 1028 may include various portions that may be fixed together, as illustrated in FIG. 28. The various portions may include the fitment 88, the substrate layer 1084*a*, the substrate layer 1084*b*, and the substrate layer 1084*c*. Each of the layers may be adhered here together, such as with selected adhesives or other appropriate materials. Further, the substrate 1084 may be over molded onto the fitment 88 of the selected embodiment. Each of the three layers may be formed separately and unified into a single member during a selected production process. Nevertheless, it is understood that the substrate 1084 may also be formed as a single unitary member that may be formed in the selected shape and/or loaded with a selected material.

Figure 30:
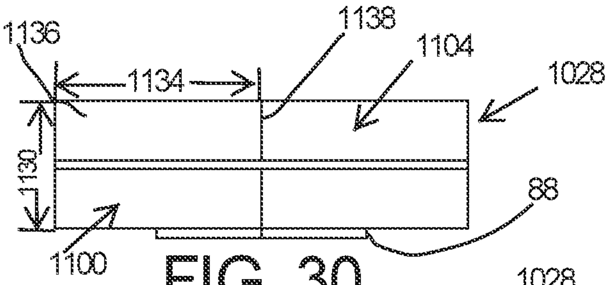
FIG. 30 is a first side vertex view of the head assembly of FIG. 28.
Figure 31:
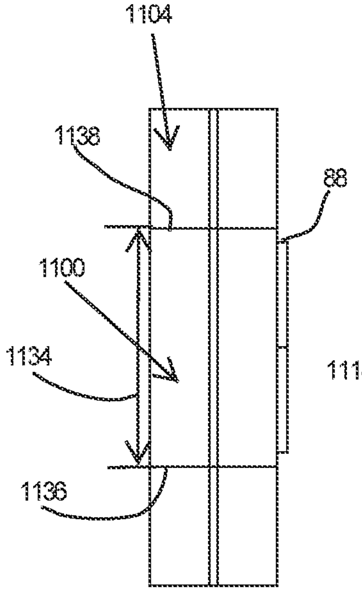
FIG. 31 is a second side face view of the head assembly of FIG. 28.

As illustrated in the figures, the regular polygon shape of the head assembly 1028 may allow the views from sides of the head assembly to be substantially identical when looking at either a face, as illustrated in FIG. 31, or a vertex 1138, as illustrated in FIG. 30. It is understood, however, that the shape of the head assembly 1028 may be a non-regular polygon such that one or more of the sides, such as the side 1100, may have a dimension greater than the other sides. Further, it is understood that the head assembly 1028 may include other polygon shapes such as pentagons, octagons, or the like. The hexagonal polygon is merely exemplary of a polygon shape of which the substrate 1084 may be formed. Nevertheless the head assembly 1028 may be connected with the handle assembly 24 to form the cleaning assembly 20 as discussed above.

Figure 37:
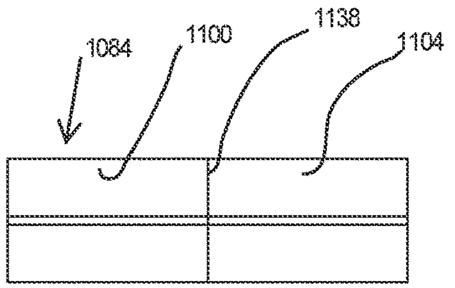
FIG. 37 is a first side vertex view of the head assembly of FIG. 34.
Figure 36:
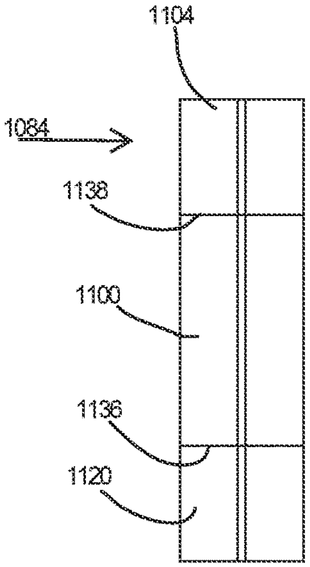
FIG. 36 is a second side face view of the head assembly of FIG. 34.
Figure 35:
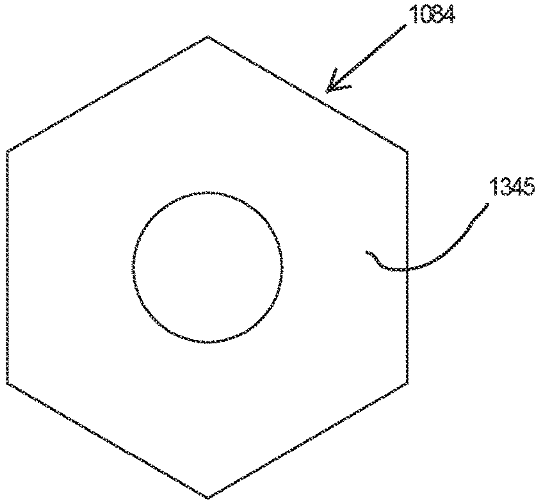
FIG. 35 is a bottom plan view of the head assembly of FIG. 34.

With reference to FIG. 34 and FIG. 35, the pad 1084 is illustrated without the fitment 88. The pad 1084 may be identical to the pad 1084 as discussed above, including the internal wall 1092 having the diameter 1096 and sides 1100-1120. The pad 1084 may further include the top surface 1344 and the bottom surface 1345. Thus, the pad 1084 may be provided as the pad 1084 for the head assembly 1028. It is understood, therefore, that the pad 1084 maybe provided without the fitment 88. It is understood that an alternative fitment or connection portion be provide and/or no fitment for connected to the handle 24. Further, the pad 1084 may have a top plan view design as illustrated in FIG. 34 and a bottom plan view design as illustrated in FIG. 35 with a face side elevation views as illustrated in FIG. 36 (similar to FIG. 31) and a vertex side elevation view as illustrated in FIG. 37 (similar to FIG. 30).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A cleaning tool assembly comprising:

a. a handle assembly extending from a proximal end to a distal terminal end; and b. a removable cleaning head comprising:

i. a cleaning substrate having a top surface and a bottom surface, and ii. a fitment connected to the cleaning substrate, the fitment has a top flange structure secured to the top surface of the cleaning substrate;

wherein the handle assembly includes:

a wand having a handle at a proximal portion and a distal end surface at a distal portion;

an engagement member with a flexible collar, the engagement member extends to the distal terminal end of the handle assembly and is configured to be coupled to the fitment or decoupled from the fitment of the removable cleaning head; and an actuation mechanism, the actuation mechanism includes an axially movable projection member axially movable relative to the engagement member having a distal engagement end configured to directly engage and contact the fitment of the removable cleaning head and eject the removable cleaning head from the engagement member of the handle assembly;

wherein the distal engagement end of the axially movable projection member is configured to extend out and beyond the distal end surface of the wand as the axially movable projection member moves axially relative to the engagement member so that an exposed distal surface of the distal engagement end of the axially moveable projection member directly contacts the fitment; and wherein axial movement of the exposed distal surface of the distal engagement end of the axially movable projection member directly against the fitment ejects and removes the removeable cleaning head from the engagement member of the handle assembly.

2. The cleaning tool assembly of claim 1, wherein the flexible collar engages with an inside surface of the fitment to secure the removeable cleaning head to the handle assembly.

3. The cleaning tool assembly of claim 1, wherein a recessed portion of the cleaning substrate is at a central region of the cleaning substrate.

4. The cleaning tool assembly of claim 3, wherein the fitment is further connected to the recessed portion.

5. The cleaning tool assembly of claim 1, wherein the actuation mechanism is configured to move from a first position where the flexible collar is expanded to a second position where the flexible collar is contracted.

6. The cleaning tool assembly of claim 1, wherein the actuation mechanism includes a movable switch located on the wand that is operable to move from a first position where the flexible collar is positioned in an expanded configuration to retain the removeable cleaning head to a second position where the flexible collar is positioned in a contracted configuration to release the removeable cleaning head.

7. The cleaning tool assembly of claim 1, wherein the actuation mechanism further includes:

a control member engageable by a user to move the control member from a first position to a second position;

wherein in the first position the axially movable projection member does not eject the removable cleaning head;

wherein in the second position the axially movable projection member is moved to eject the removeable cleaning head.

8. The cleaning tool assembly of claim 1, wherein the actuation mechanism further includes:

a biasing member to bias the flexible collar in an expanded configuration.

9. The cleaning tool assembly of claim 1, wherein the flexible collar is expanded when coupled to the fitment.

10. The cleaning tool assembly of claim 9, wherein the flexible collar is contracted at least when decoupled from the fitment.

11. A cleaning tool assembly comprising:

a cleaning head having a recessed connection portion; and an handle assembly extending from a proximal end to a distal terminal end, the handle assembly includes:

a wand having a handle at a proximal portion and a distal end surface at a distal portion, a flexible engagement member configured to engage the recessed connection portion of the cleaning head, and an axially movable projection member axially movable relative to the flexible engagement member having a distal engagement end surface configured to directly engage and contact the cleaning head upon moving axially relative to the flexible engagement member;

wherein the distal engagement end surface of the axially movable projection member is configured to extend out of and beyond the distal end surface of the wand as the axially movable projection member moves axially and beyond the distal end surface of the wand to directly engage and contact the cleaning head with the distal engagement end surface; and wherein axial movement of the distal engagement end surface of the axially movable projection member directly against the cleaning head ejects and removes the cleaning head from the flexible engagement member of the handle assembly.

12. The cleaning tool assembly of claim 11 further comprising a fitment forming part of the cleaning head having the recessed connection portion.

13. The cleaning tool assembly of claim 11 further comprising a control member engageable by a user to move the axially movable projection member from a first position to a second position;

wherein in the first position the axially movable projection member does not eject the cleaning head from the handle assembly;

wherein in the second position the axially movable projection member ejects the cleaning head from the handle assembly.

14. The cleaning tool assembly of claim 1, wherein a bore defined by the fitment is an open bore.

15. The cleaning tool assembly of claim 1, wherein the flexible collar flexes when coupled to the fitment.

16. The cleaning tool assembly of claim 11, wherein the flexible engagement member includes a flexible collar configured to flex to couple the cleaning head to the handle assembly.

* * * * *